358-84. XR 3,070,652 SR

ROSS REFERENCE SEARCH ROOM

Dec. 25, 1962 T. A BANNING, JR 3,070,652

RADIO AND TELEVISION PROGRAM SELECTING, AND TIME OF USE RECORDING

Filed July 16, 1956 18 Sheets-Sheet 1

Inventor:

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 3

Inventor:

Inventor:
Thos. A. Banning Jr.

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 5

Inventor:

Thos. A. Banning, Jr.

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 6

Inventor:

Theo. A. Banning, Jr.

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 7

Inventor:

Inventor:
Thos. A. Banning Jr.

Inventor:

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 10

Inventor:

Thos. A. Banning, Jr.

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 11

Inventor:

[signature]

Inventor:
Thos. A. Banning, Jr.

Inventor:
Thos. A. Banning, Jr.

Inventor:
Thos. A. Banning, Jr.

Inventor:
Thos. A. Banning Jr.

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 16

Inventor:
Thos. A. Banning Jr.

Dec. 25, 1962 T. A. BANNING, JR 3,070,652

RADIO AND TELEVISION PROGRAM SELECTING, AND TIME OF USE RECORDING

Filed July 16, 1956 18 Sheets-Sheet 17

Inventor:
Thos. A. Banning Jr.

Inventor:
Thos. A. Banning, Jr.

United States Patent Office 3,070,652

Patented Dec. 25, 1962

3,070,652

RADIO AND TELEVISION PROGRAM SELECTING, AND TIME OF USE RECORDING

Thomas A. Banning, Jr., 5520 South Shore Drive, Chicago, Ill.

Filed July 16, 1956, Ser. No. 597,950
59 Claims. (Cl. 178—5.1)

Figure 1:
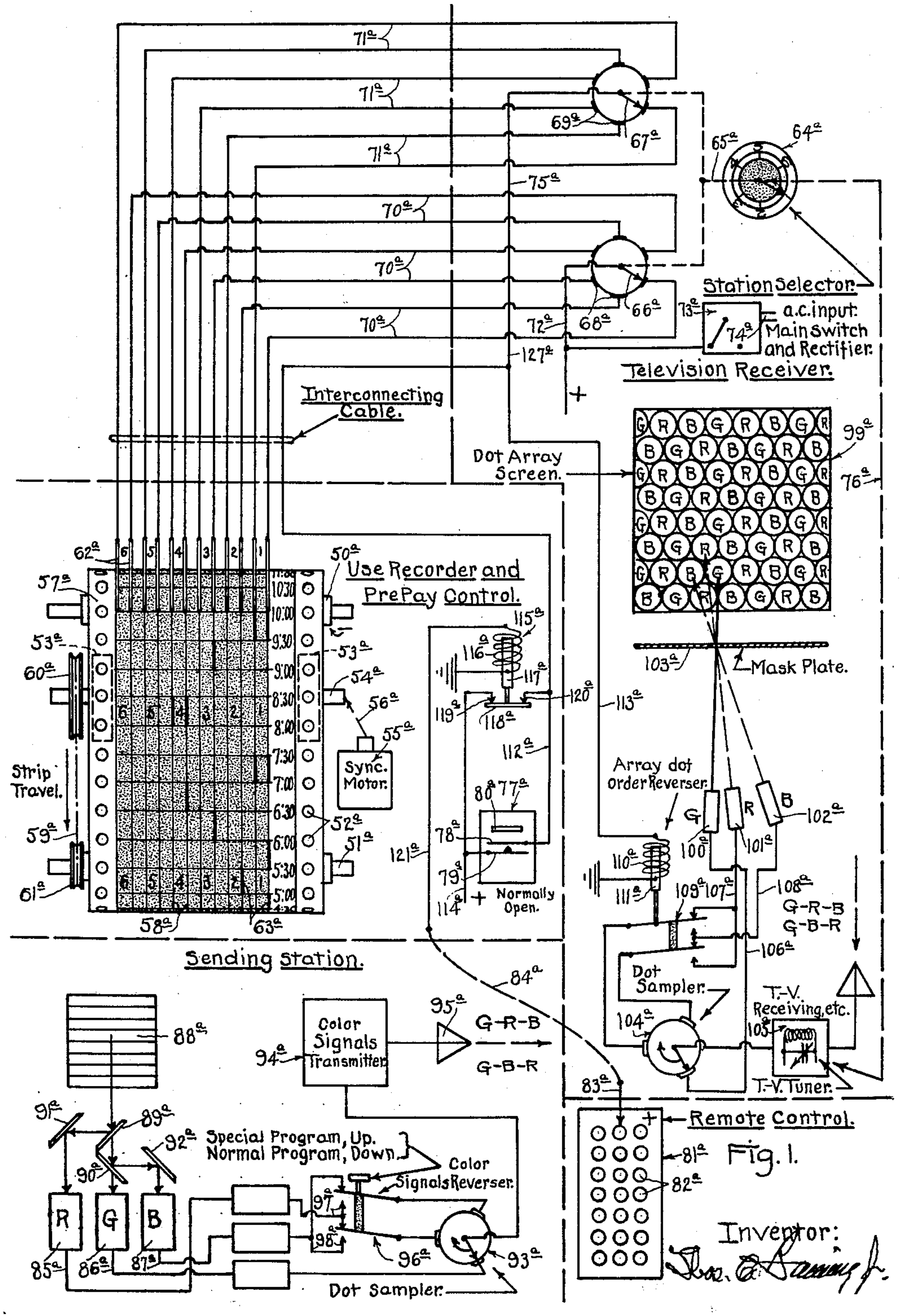

This invention relates to improvements in radio and television program selecting, and time of use recording. A prime object of the invention relates to means to produce a continuous record of the use of the radio or television receiver, showing times when such receiver is in use. In this connection it is a further object to provide a recording unit which shall be capable of not only making a record of the times of use of the receiving equipment, but the station to which such receivers from time to time are tuned is continuously recorded. Analysis of such recording then makes it possible to distribute the time of use among various stations which may have been tuned by such receiver. A further purpose satisfied by this feature is the continuous provision of accurate recordings of the times of day of all uses with distribution of such uses among all of the stations to which the receiver was tuned, showing the time of day of each such tuning. Such stations would generally be those broadcasting in the general locality where such receiver was located.

A further important feature of the invention relates to provision for discriminating between programs which may be, for convenience here termed as "ordinary programs," and other programs here for convenience termed as special programs. When provision is made for ensuring payment for such special programs, such provision may be of one or several kinds. A simple provision is the use of a coin or control box located near the receiver and interconnected to the receiver circuitry in such manner that actuation of such coin or control box is necessary by insertion of the proper coin or coins, or tokens, or other coin or control or release element into such control box to enable reception of the pre-selected "special" program. Another arrangement contemplates the provision of means such that when the desired "special" program is to be received a secretary or authorized person at a remote control point such as a central station shall so set circuits that such program may be received. Other arrangements contemplate the use of punched cards, special key cards or the like into the receiver or an ancillary unit, and various arrangements have been produced relating to this general scheme. Various of the embodiments of my present invention hereinafter to be described are such that whenever a program is being emitted from the broadcasting station to which the receiver is tuned an intelligible reception may be produced by the receiver even without the actuation of the pre-pay or control unit, but of a quality less desirable than can be produced from the signals being emitted by such broadcasting station when a pre-pay or other payment arrangement is made to receive such higher quality program. In Letters Patent of the United States, No. 2,755,334, issued to me July 17, 1956, I have disclosed and claimed various arrangements of receiver by which it is possible to obtain a color emitted signal program reception selectively in either monochrome or true colors at the selection of the operator of such receiver and as a fully intelligible and non-scrambled reception in either case; and in this connection I have also disclosed and claimed in such Letters Patent arrangements in connection with the operator selecting means. Various of the recording arrangements presently to be disclosed herein may be used in connection with the features disclosed in or covered by that Letters Patent. Therefore I have herein disclosed combination arrangements including such previous forms of selective reception in combination with the recording equipment by which a time distribution may be made of all uses of the receiver, including reception of each such special program in its higher or more desirable quality form—for example in color instead of monochrome, when the signals are being emitted from the broadcasting station for such color or higher quality reception.

In connection with the foregoing it is emphasized that the recording arrangements herein disclosed produce a record of use vs. time of use without discriminations between such uses generally and those which are based on the pre-pay operation fail to provide the means to distribute receipts received from the pre-pay operations between various broadcasting stations emitting the pre-pay or special programs. Accordingly, in the absence of provision of means to produce a recording of the uses with distribution of such uses between various broadcasting stations or their sponsors no means is available to distribute the pre-payment receipts properly between those persons or organizations entitled to participate in such prepayments, I have herein disclosed recording arrangements capable of producing the desired distribution of times of use not only between various broadcasting stations, but also to discriminate between pre-pay uses and non-pre-pay uses in a manner to enable the productions of the desired accounting operations. The means herein disclosed to effect such recordings are fully automatic and produce the desired records without special operations on the part of the operator or other person beyond the simple operations needed to bring the pre-pay programs into use.

A further feature and object of the invention is to provide arrangements by which, when a radio or a television program is being emitted all of the foregoing operations may be ensured with reception by the receiver on either the "ordinary" or the "special" order of reception and with production of an intelligible and acceptable translation of the received signals in either selected reception. That is, these features of the invention enable reception of the program in either its ordinary or its special order of reproduction, and in either case such reproduction will be an intelligible and acceptable one, as distinguished from a mere scrambled or non-intelligible translation in either case. Thus the operator of the receiver is provided with the means to make a choice between two or more grades of reception or translation of the emitted program, one or more of which grades will be on the non-pre-pay or charge basis. Such arrangements are to be clearly differentiated from those previously known arrangements under which the received signals are "scrambled" or otherwise rendered unintelligible, when the pre-pay or charge arrangement is not made, and in which the pre-pay or charge operation serves to render the reception intelligible. Various arrangements capable of producing these effects and choices now for the first time available are disclosed in the aforesaid Letters Patent No. 2,755,334, but such disclosures therein made do not include the means to effect recordings such as already referred to herein.

A further and important object of the present invention is to provide arrangements whereby presently equipped and operating broadcasting stations may be enabled to effect sending of the needed signals to enable reception and translation of such signals to effect the operations hereinafter disclosed. When it is necessary to effect changes in the sending equipment for the foregoing purposes such changes are of a minor nature, and can be effected in the equipment of the broadcasting station at small cost and without serious interference with current broadcasting operations. In this connection I have also herein disclosed an arrangement wherein and whereby it is possible to effect the desired discrimination and change of reception between either the "ordinary" or the "special" grade of such reception without any changes whatsoever at the broadcasting station and merely by provision of suitable means in the receiver itself.

Since many broadcasting stations are presently equipped to emit signals for color translation at the receiver it is evident that in the absence of some modification of the sending equipment and the signals a television receiver which is equipped with means to receive and translate such color emitted signals can do so without prepay if he so desires. It is a further and important feature of the present invention to make provision for preventing intelligible reception of such color emitted program, in color, by a slight change in or addition to the equipment of the broadcasting station, while at the same time enabling the operator of the receiver to receive such program in monochrome or otherwise as a lower or "ordinary" grade of reception, and as a fully intelligible and acceptable and non-scrambled reception and without having to make the pre-pay operation or corresponding operation of accountancy.

A further object of the invention relates to the provision of arrangements to enable reception of a radio program, so called, as distinguished from a television program, on a basis of either of two grades of reception and translation, one of which shall be of the pre-pay type, and the other one non-pre-pay or not requiring payment at some time.

Figure 2:
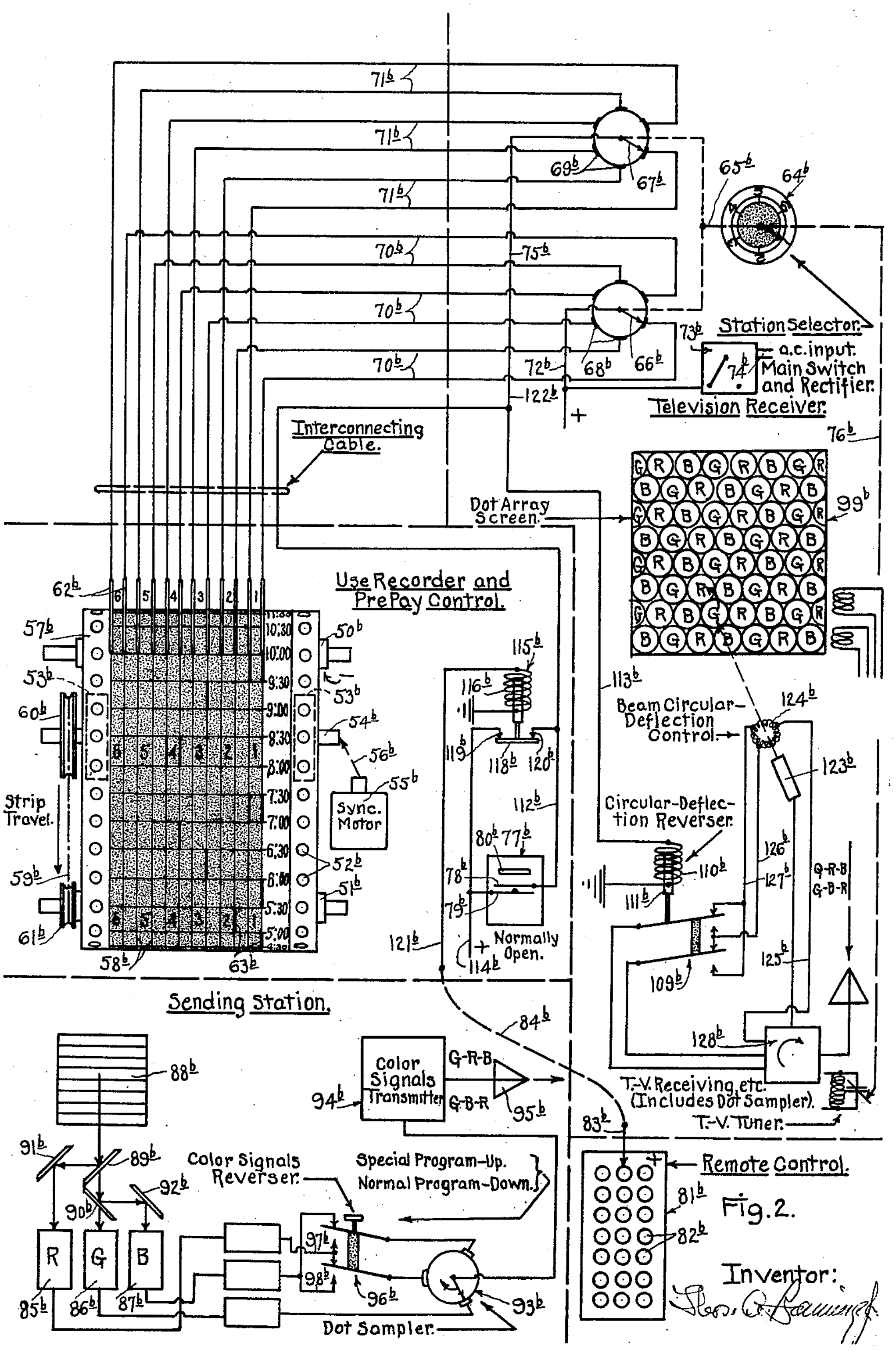
Figure 3:
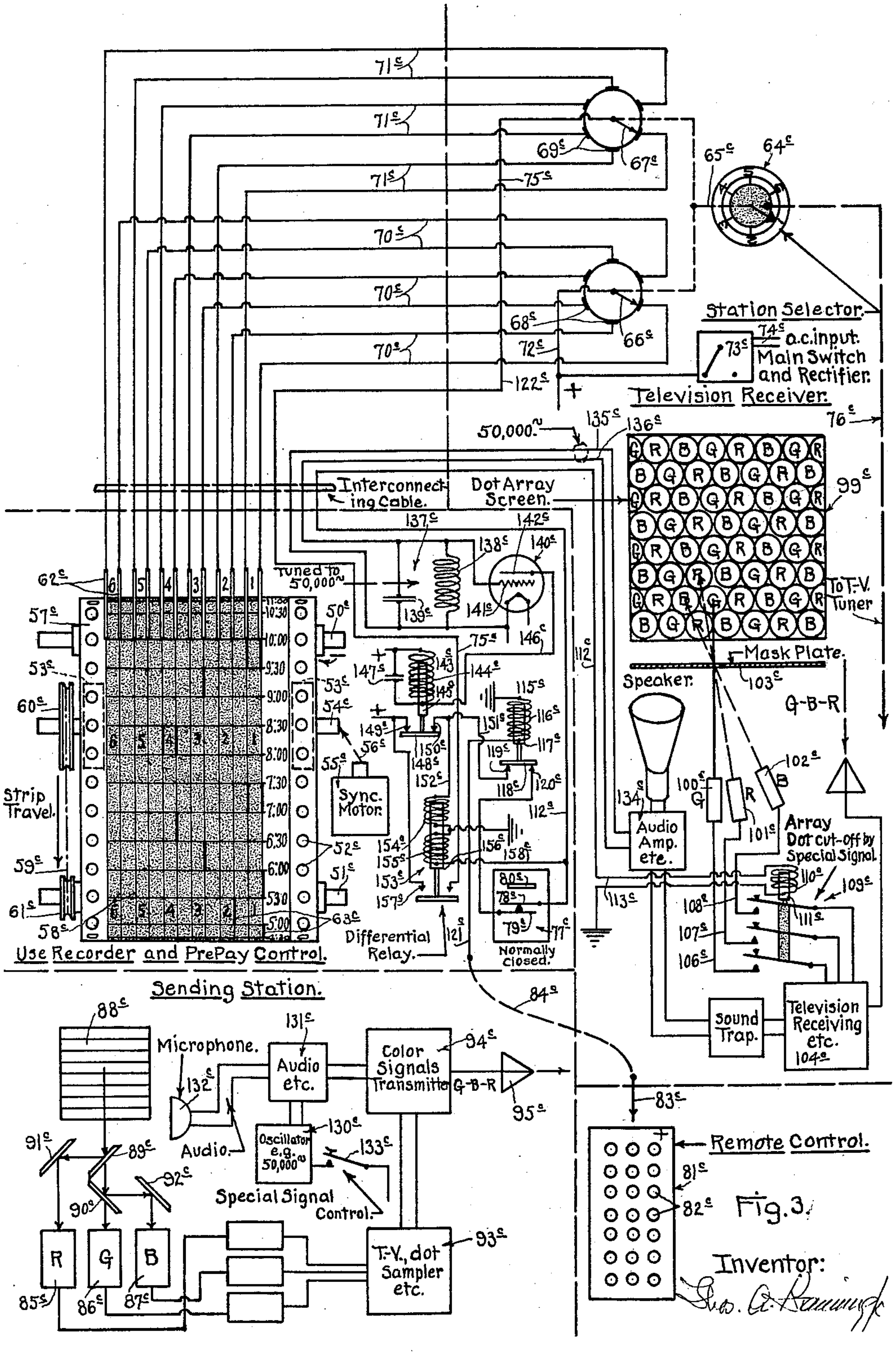
Figure 4:
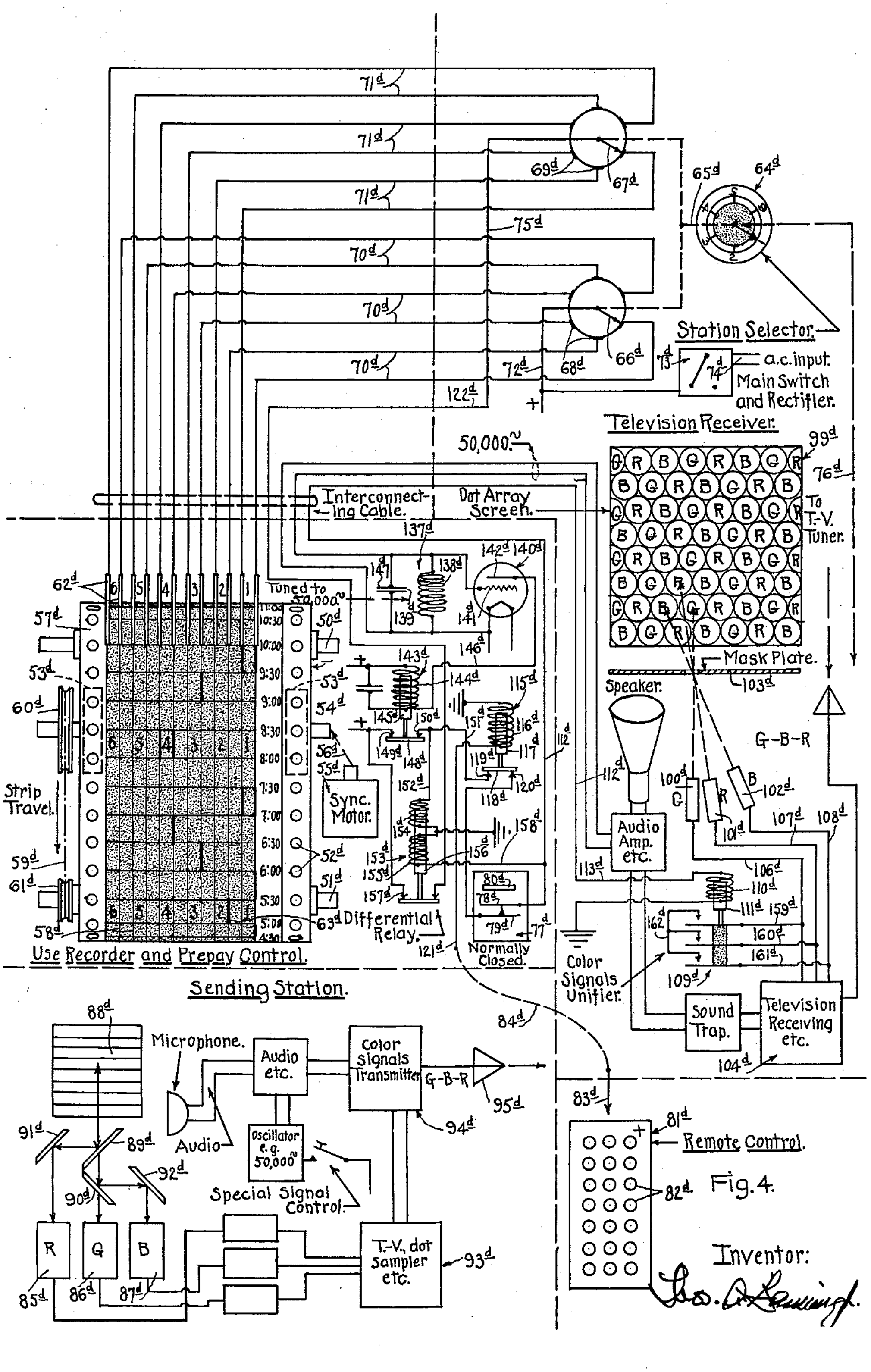
Figure 5:
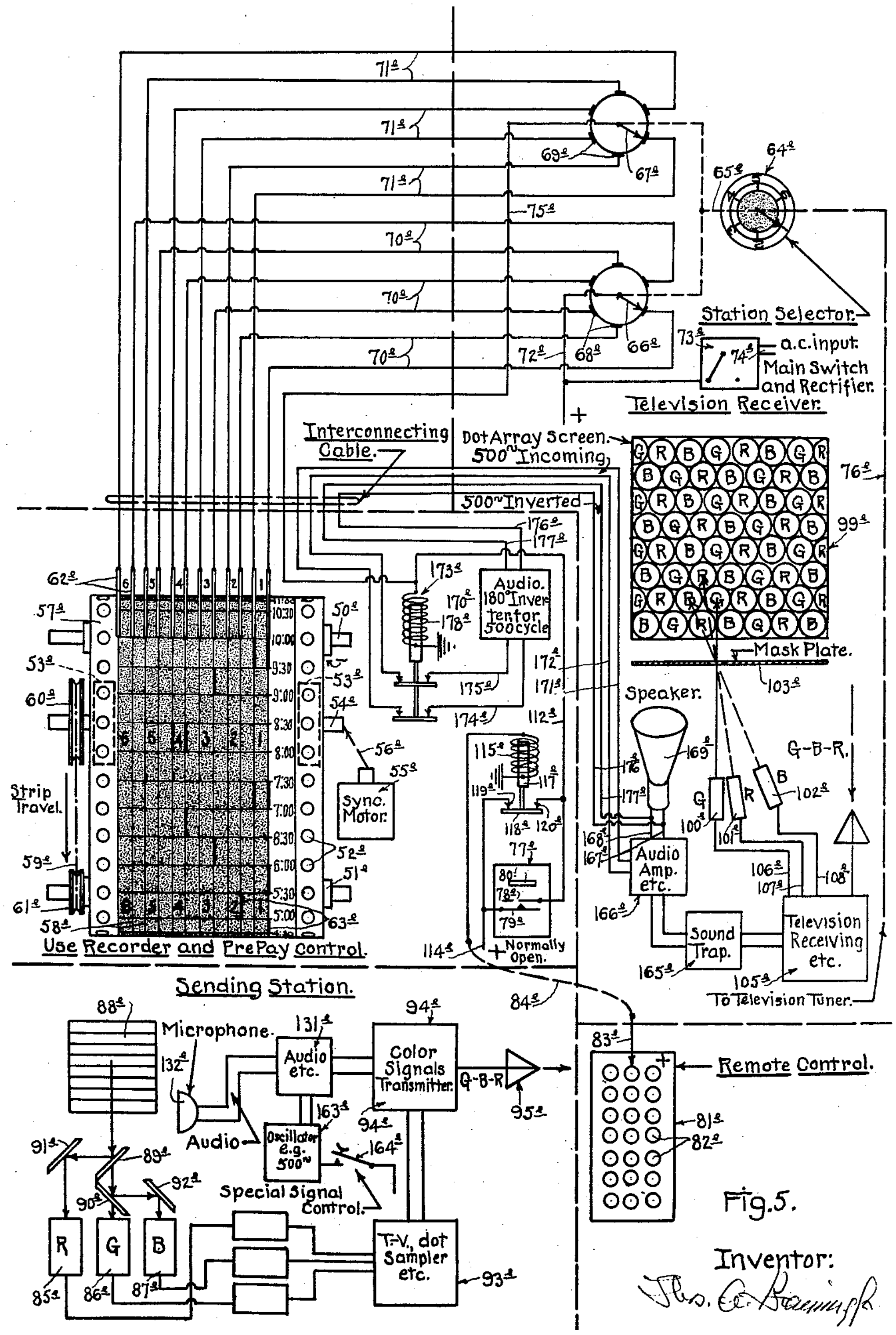
Figure 6:
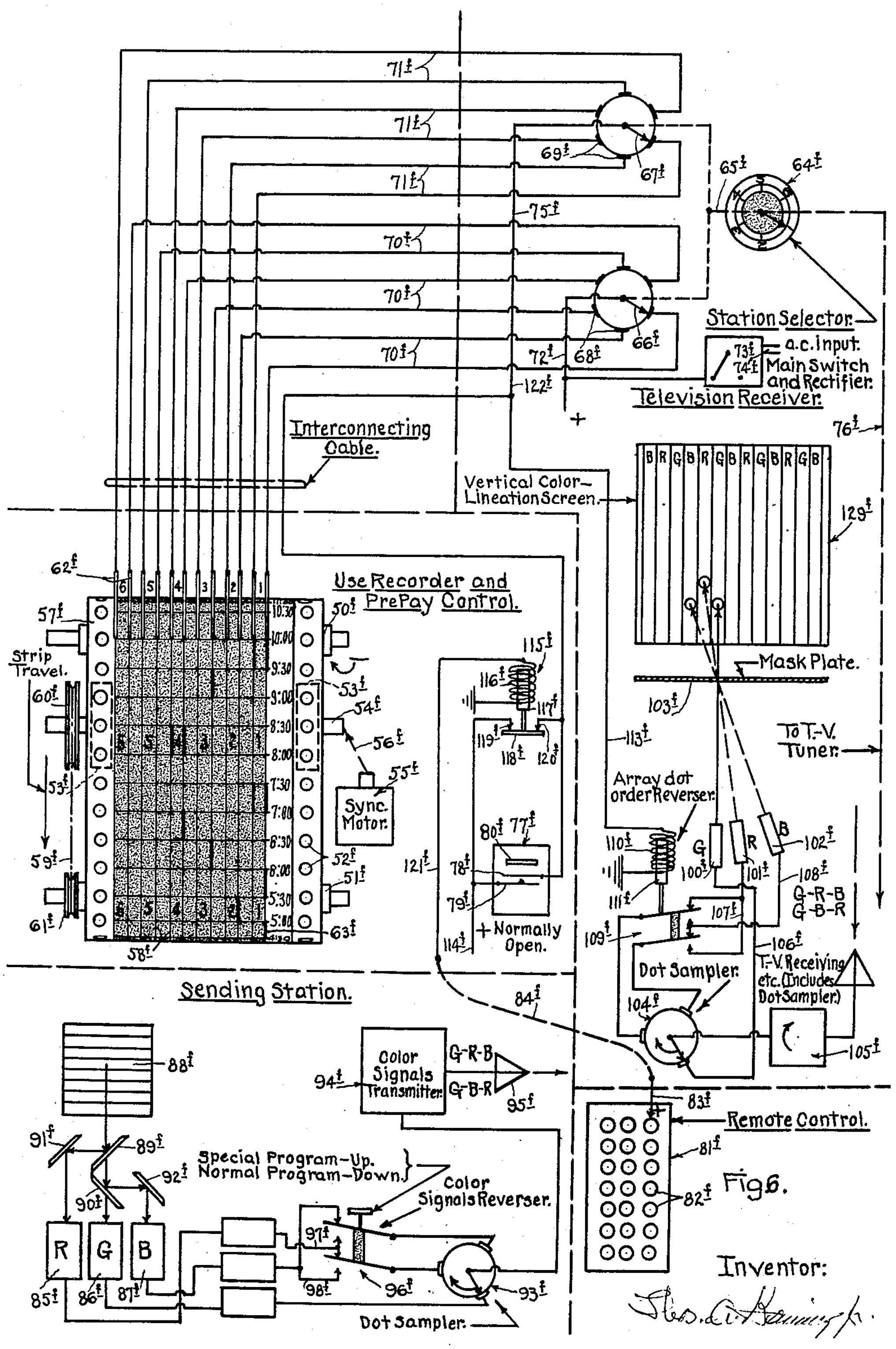
Figure 7:
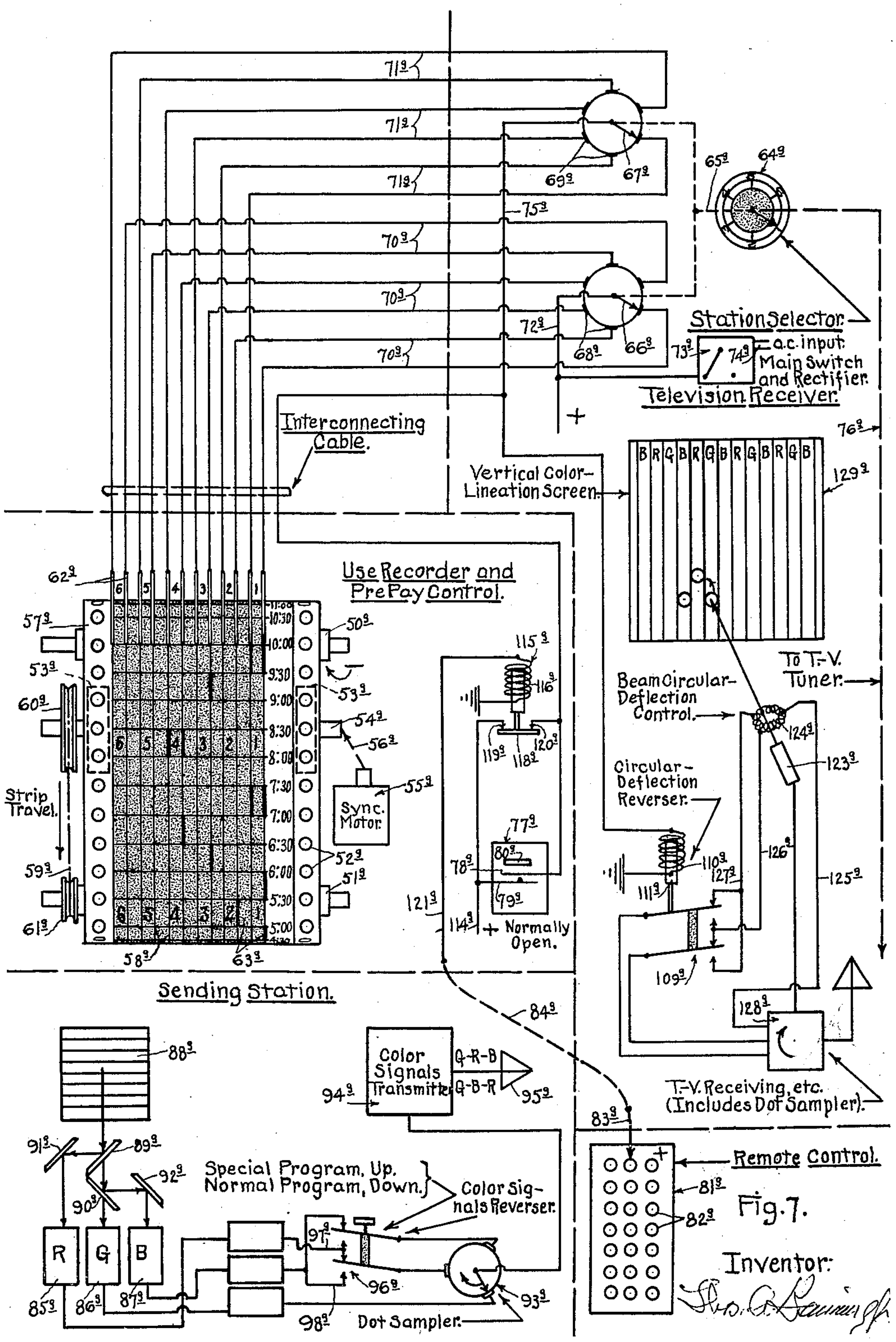
Figure 8:
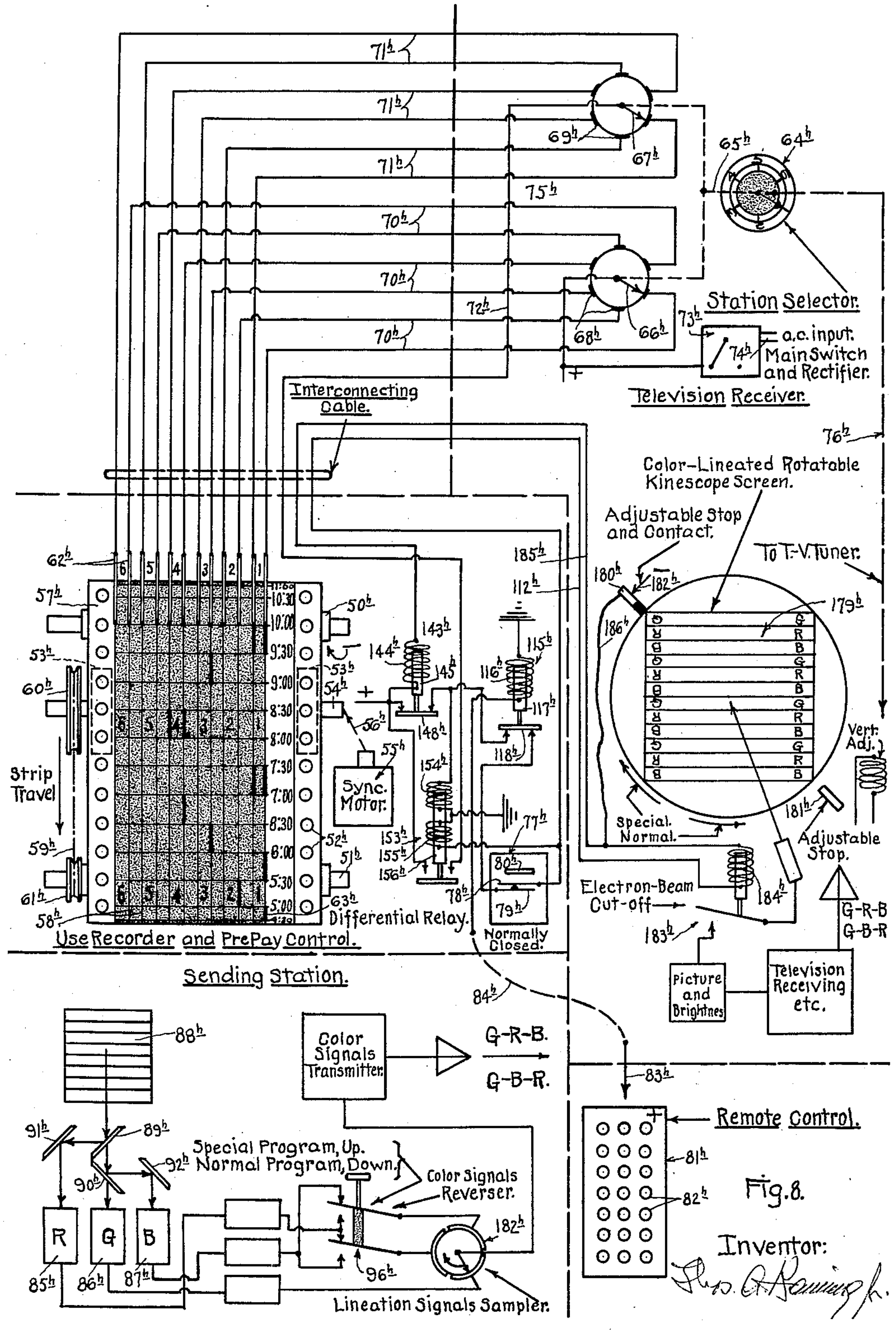
Figure 9:
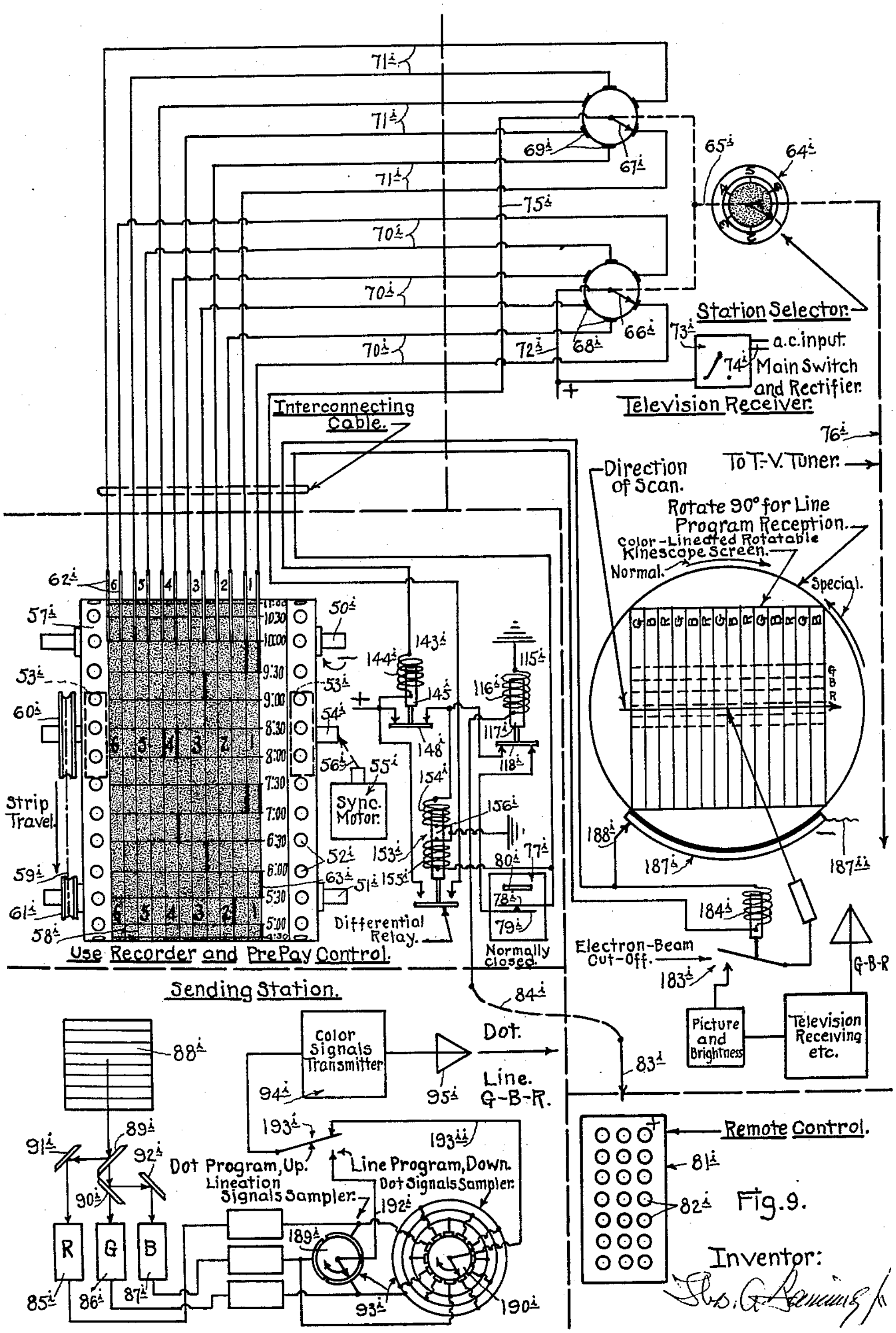
Figure 10:
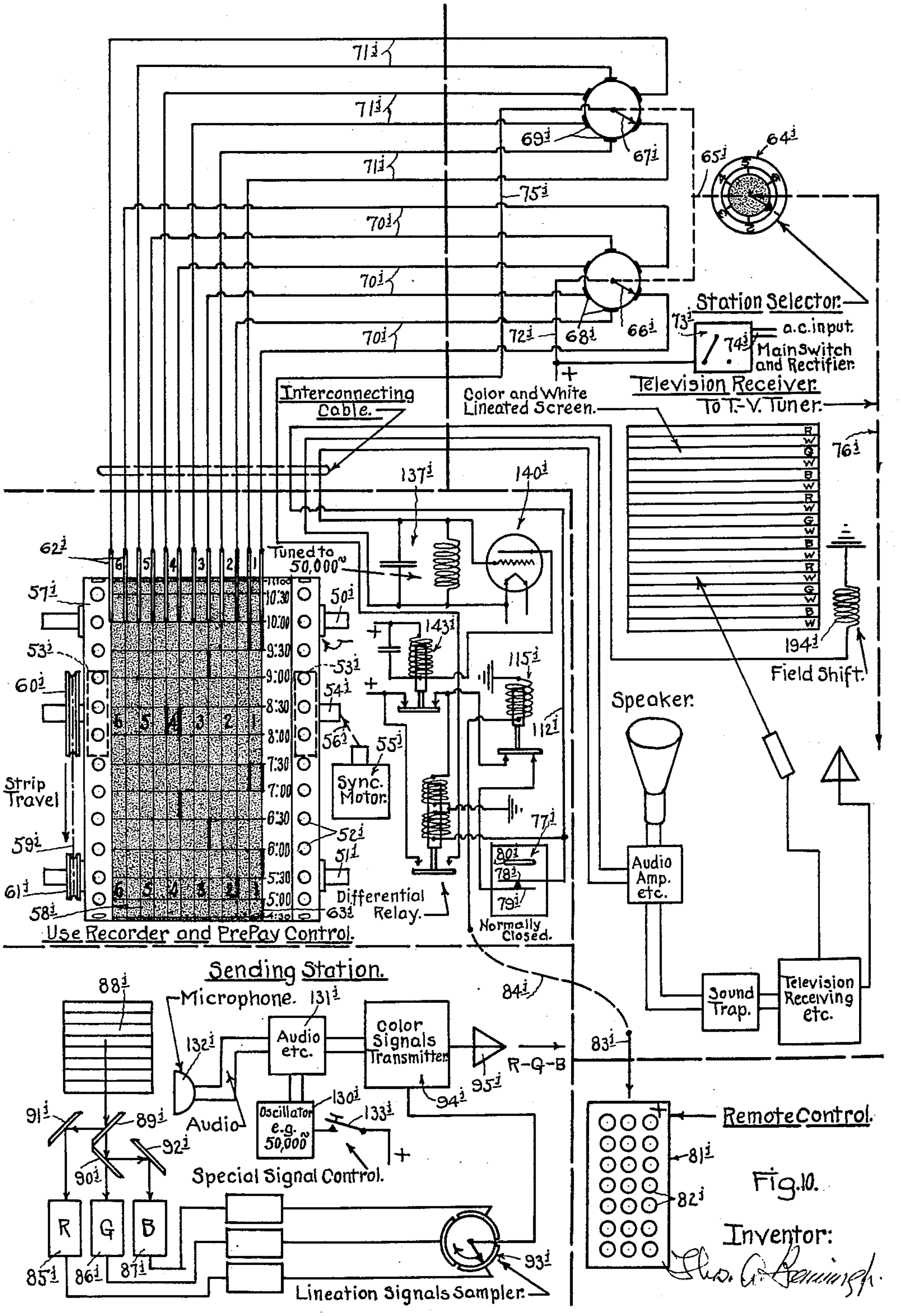
Figure 11:
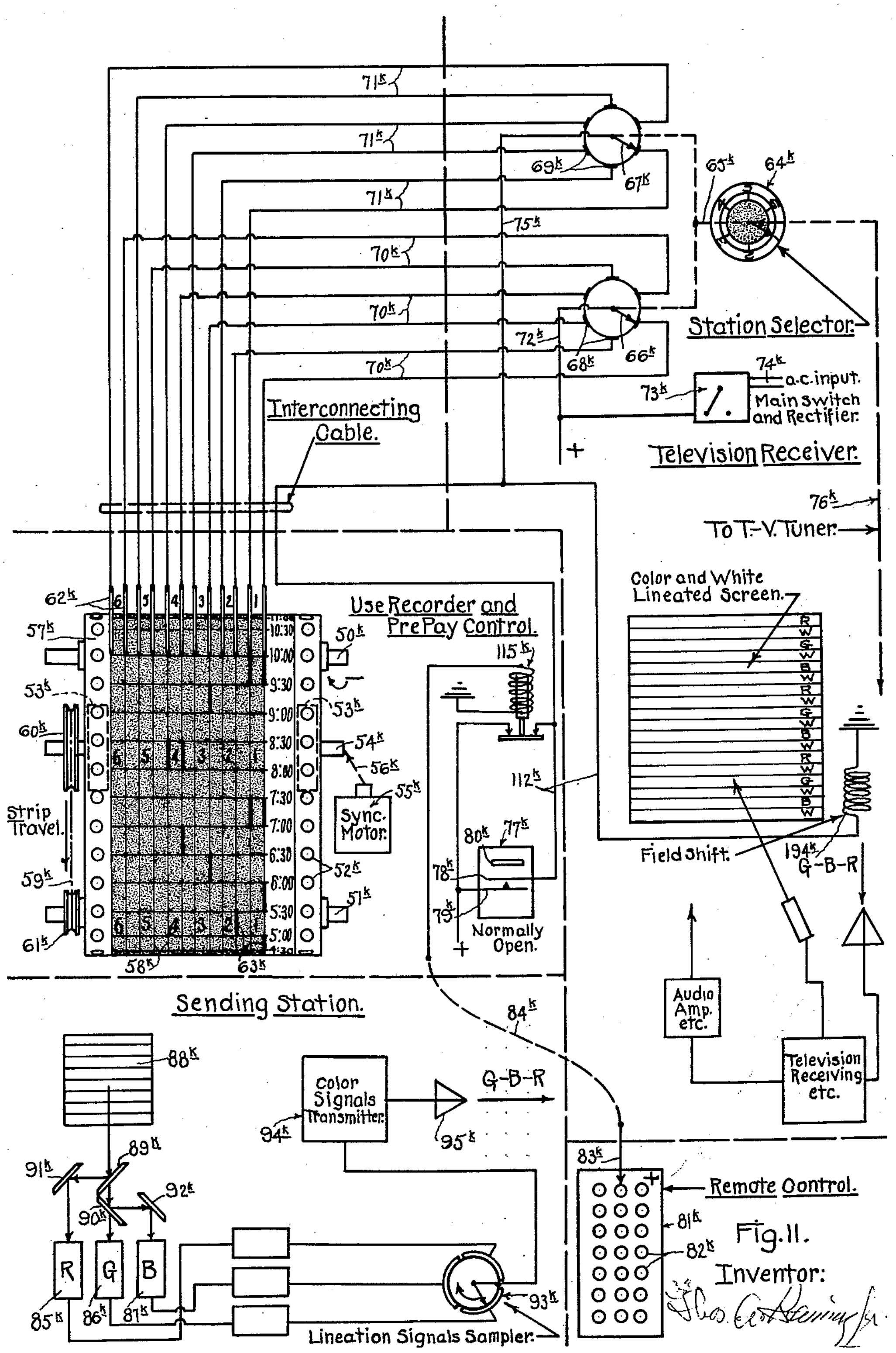
Figure 12:
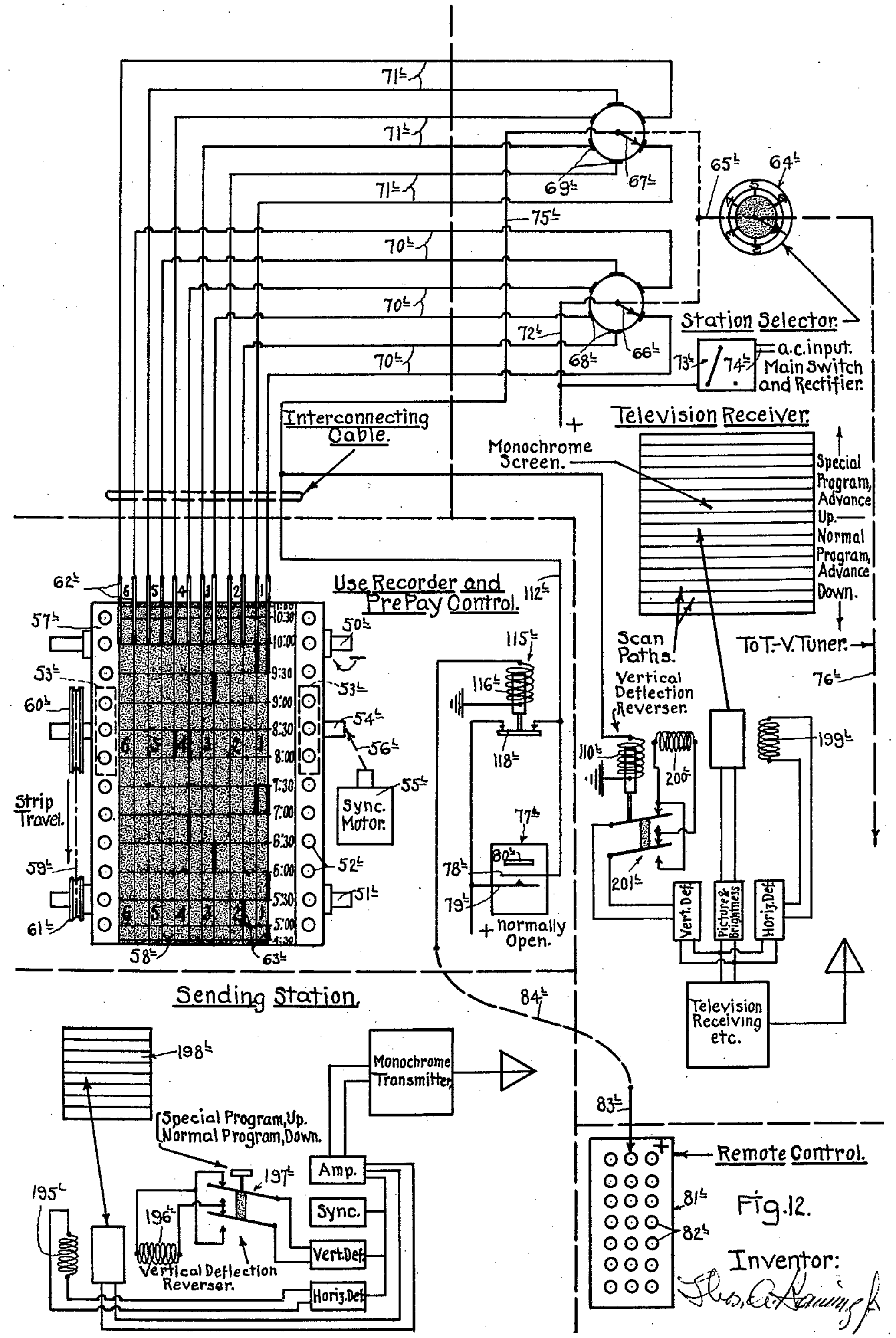
Figure 13:
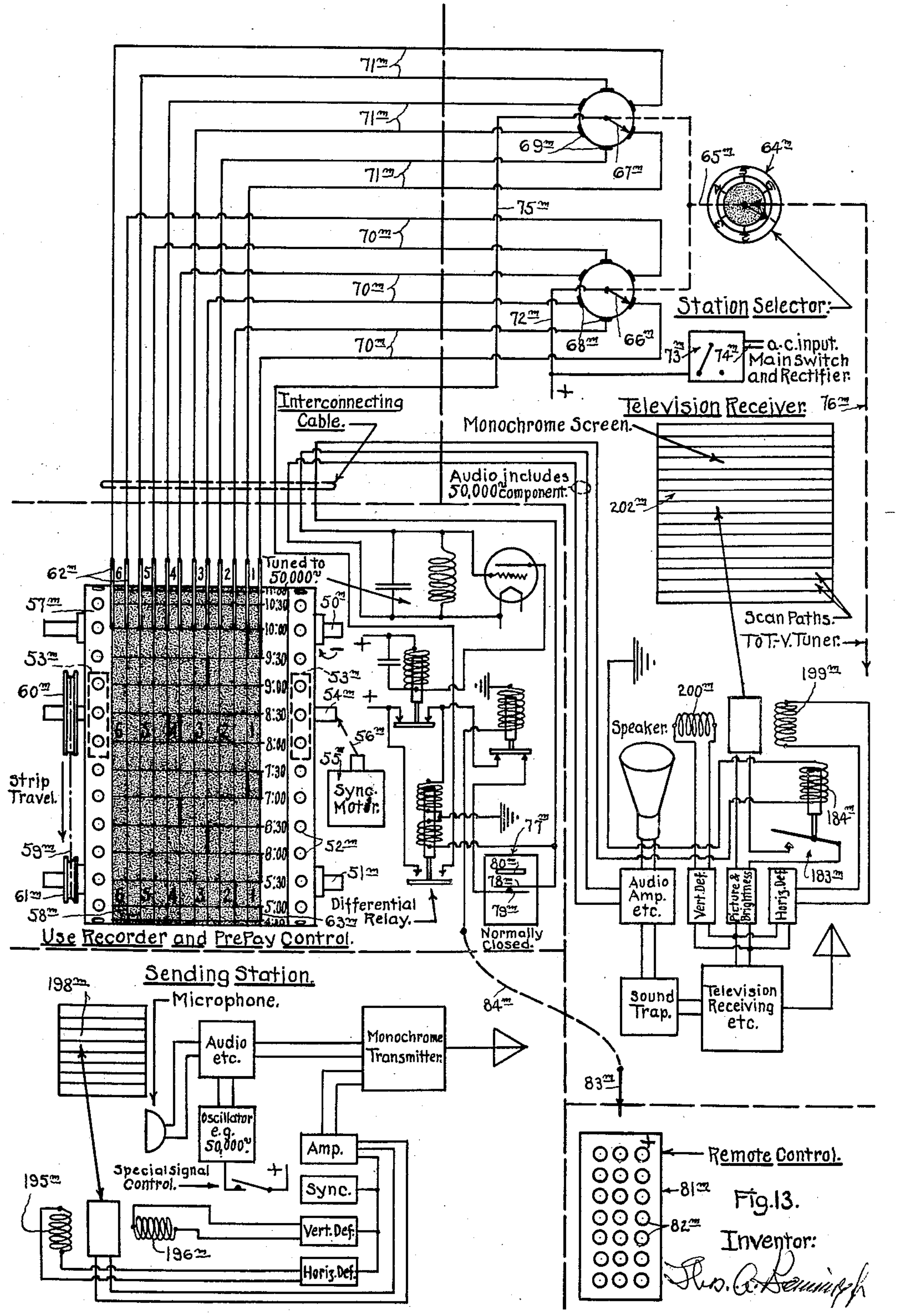
Figure 14:
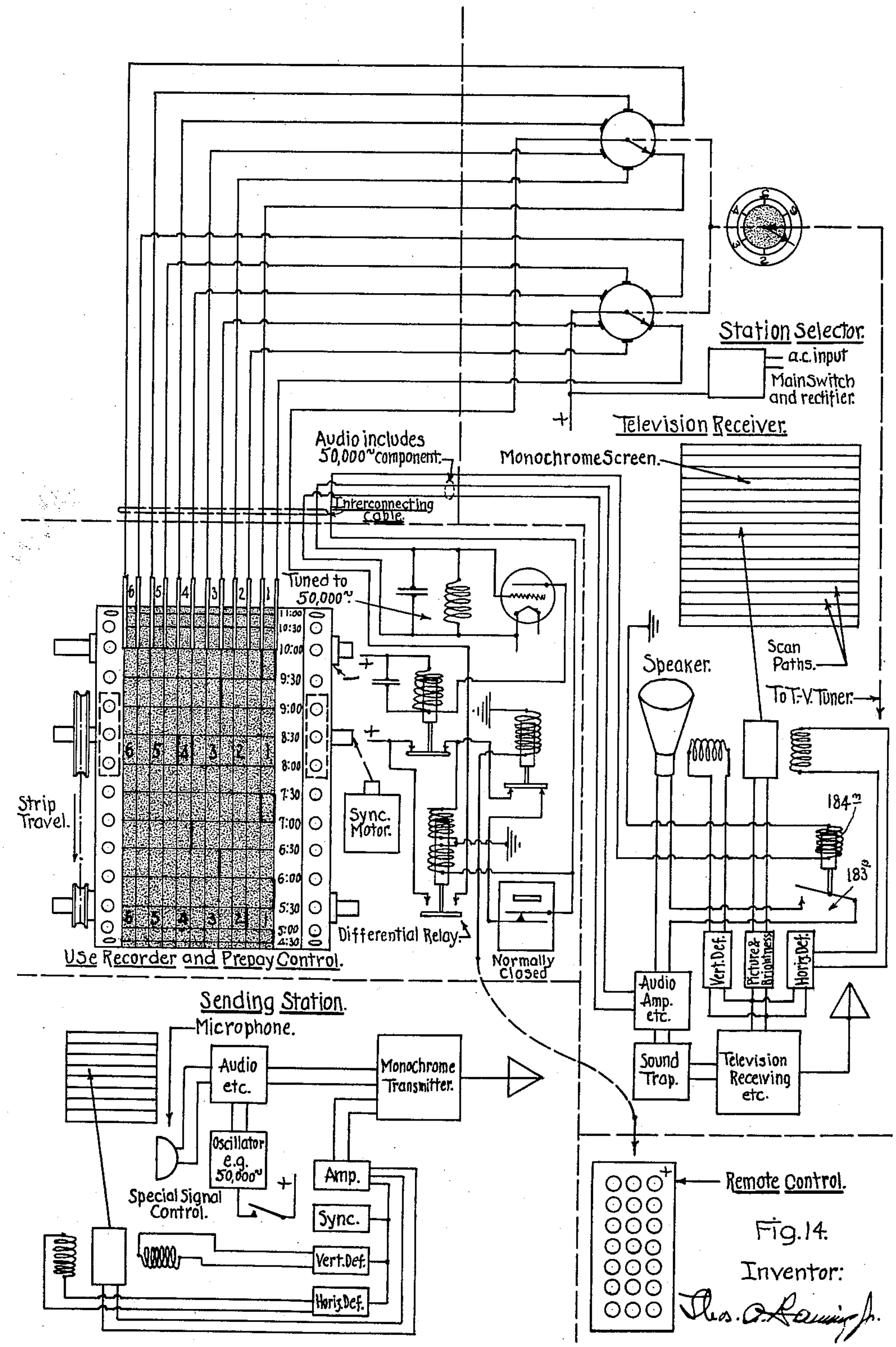
Figure 15:
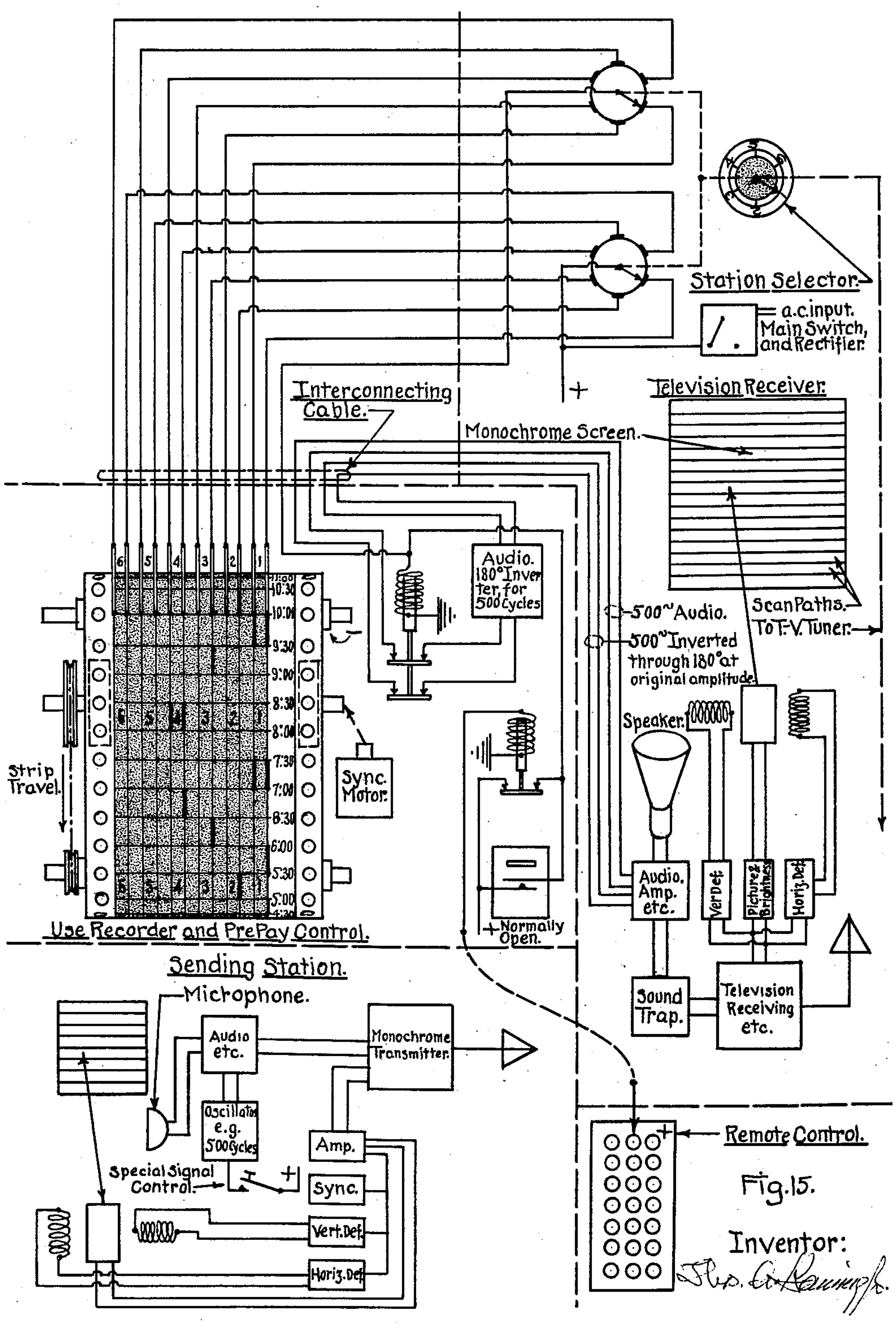
Figure 16:
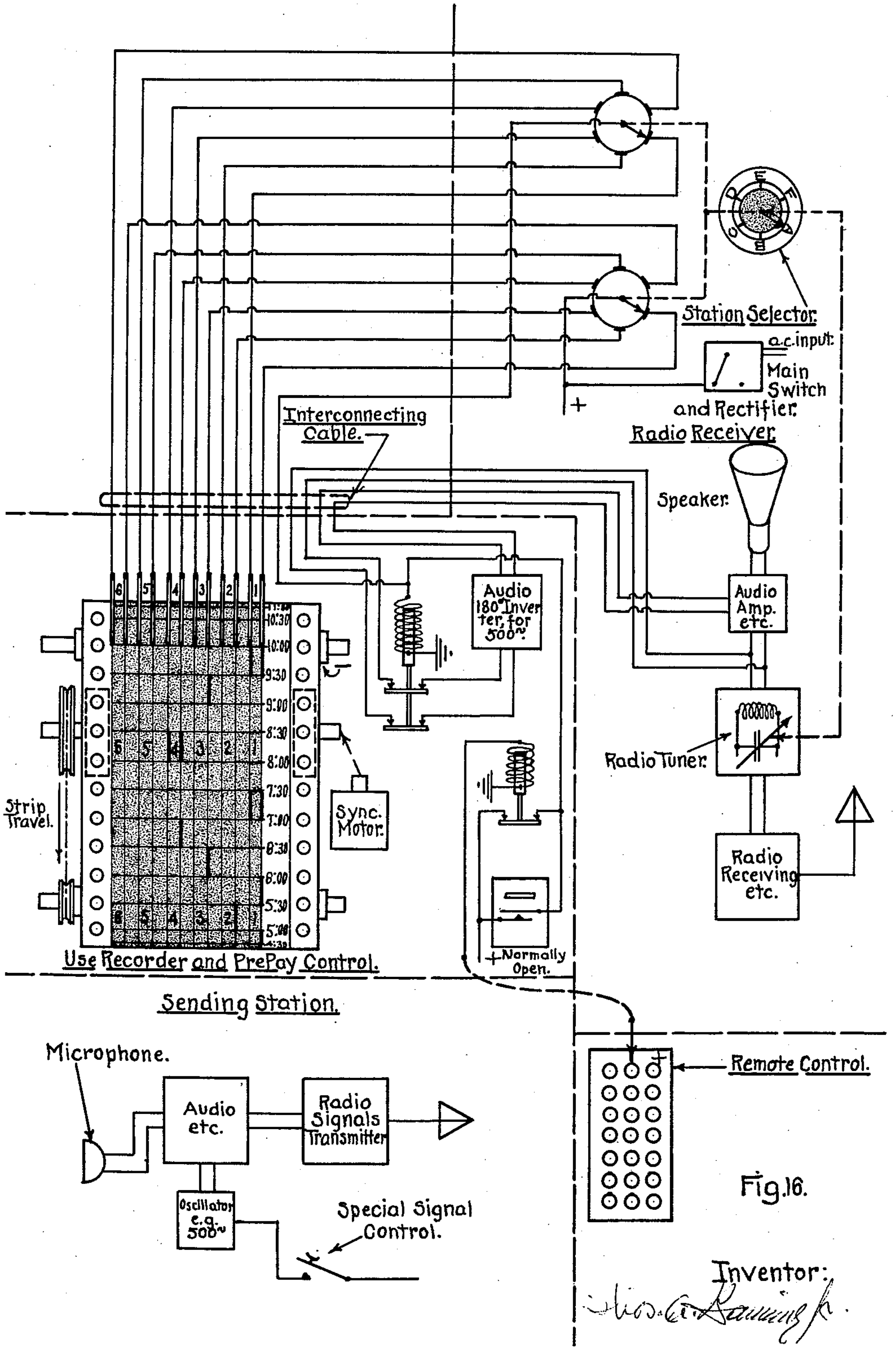
Figure 17:
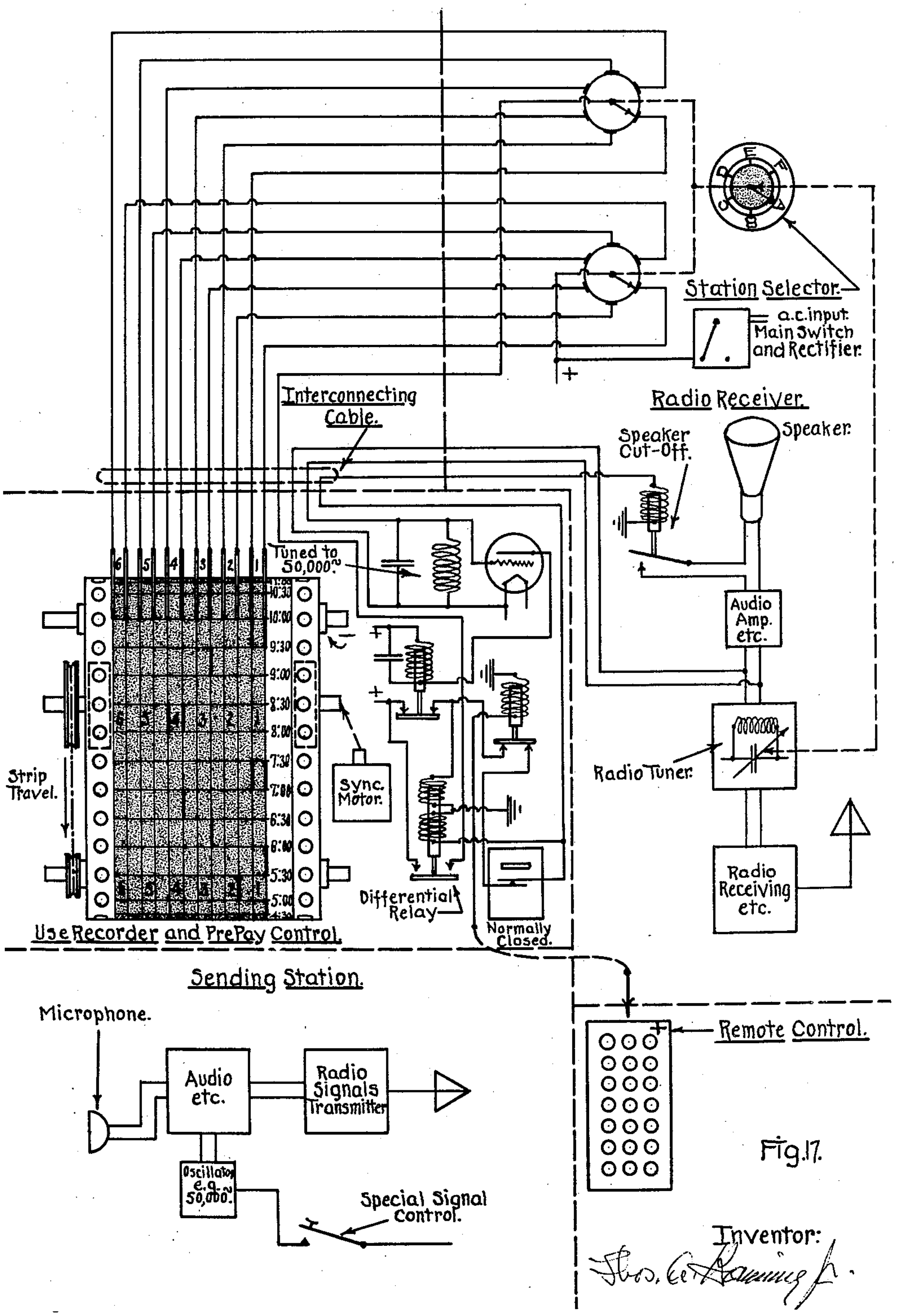
Figure 18:
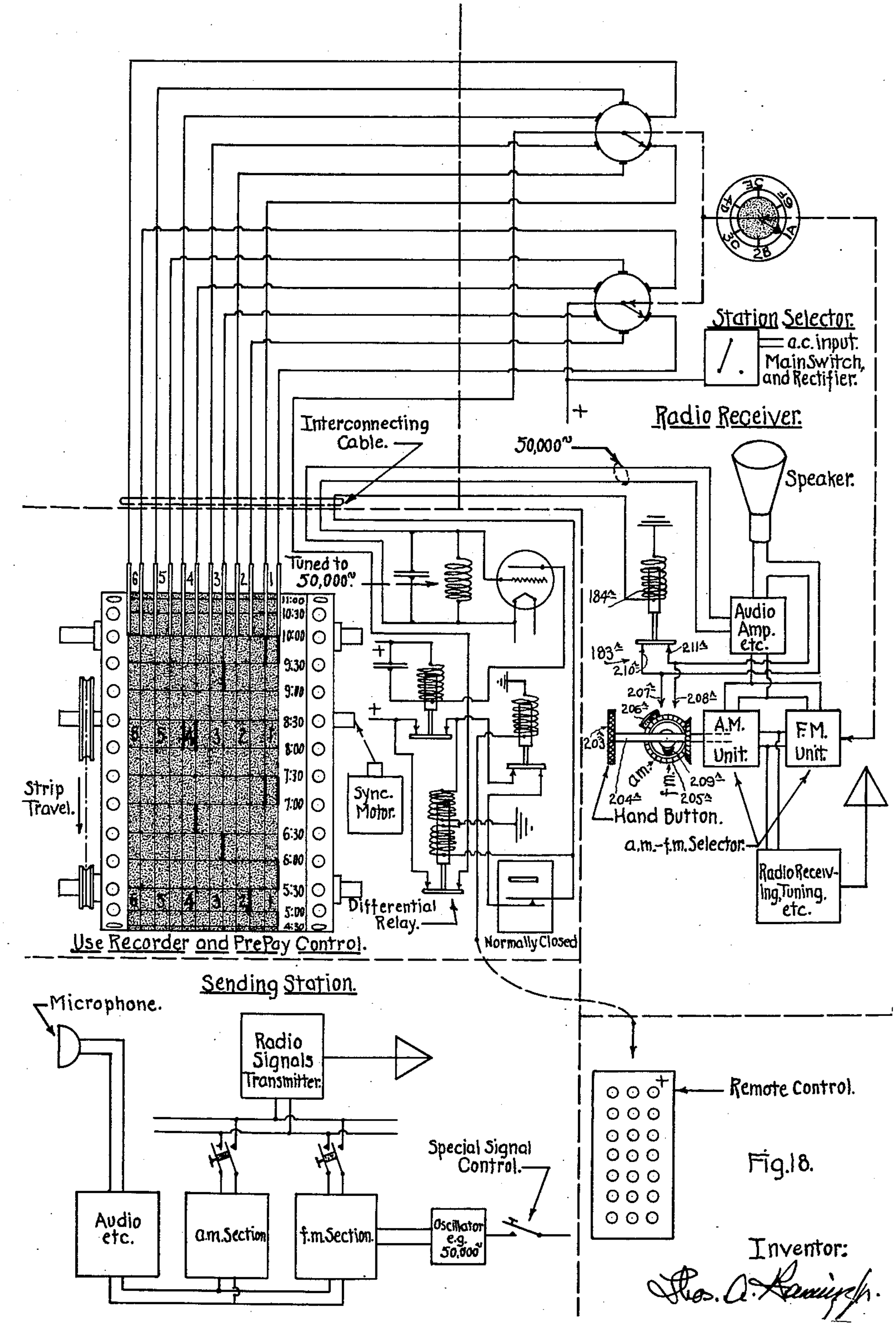

In the drawings:

FIGURE 1 shows schematically a system of broadcasting signals for color reception on the three dot color array principle, with means at the sending station to reverse the order of emission of the three colors when a special program is to be broadcast, together with a three electron gun receiver which normally receives the color signals in their conventional order, so that when such reversed order signals are emitted by the sending station they will be received in improper order of the colors and thus an incorrect color translation will be produced, together with a reversing switch at the receiver to bring the order of color translation into harmony with the order of signal emission, such receiver switch being controlled by the pre-pay unit or by remote control; and this figure also shows schematically a recorder by which all uses of the receiver will be recorded in proper station relationship, and also by which the use of the special program reception will be time recorded against the proper sending stations;

FIGURE 2 shows schematically an arrangement similar to that of FIGURE 1; but in the arrangement of FIGURE 2 the receiver is provided with a single electron gun together with means to shift the electron beam in circular or wave motion to bring it succesively into registry with the three color dots of each array; and in this figure the sending station is provided with a reversing switch to reverse the order of the emitted color signals so that incorrect color reception will occur at the receiver in the absence of corresponding reversal of the direction of circular or wave movement of the electron beam of such receiver, together with a reversing switch in the receiver which is controlled by the pre-pay unit or by remote control to produce correct color translation by the receiver;

FIGURE 3 shows schematically a system of broadcasting signals for color reception on the three color dot array principle, with means at the sending station to inject into the emitted signals a control frequency signal, preferably of super-sonic frequency so that it will not affect the audible signals translated by the audio system of the receiver, and the three gun receiver is provided with a cutout switch for its three electron guns so as to "kill" the reception when such switch is opened; together with a frequency responsive circuit tuned to respond to the special frequency signal and deliver an actuating current to the aforesaid switch's operating means and thus kill the reception, and with means under control of a pre-pay unit or remote control to restore the switch to its closed position when pre-pay has been made, or when the remote control is properly operated; together with a recorder to record the use against time corresponding to various emitted station programs, and with further provision to make a record of the uses corresponding to the received special programs;

FIGURE 4 shows schematically an arrangement similar to that of FIGURE 3; but in the present embodiment the switch of the receiver serves when in closed position to tie all three of the receiver's electron guns together so that all color signals are delivered to all three such electron guns to produce a monochrome reception without pre-pay or remote control; and this arrangement is such that when pre-pay or remote control is made such switch is opened to allow the three electron guns to function individually according to normal color reception;

FIGURE 5 shows schematically an arrangement including the three electron gun receiver, together with audio reception in the receiver and audio emission by the sending station; and this arrangement includes provision for injecting into the emitted signals an audio frequency note such as, for example a 500 cycle/sec. signal which will then produce an objectionable noise during the reception, together with an inverter arrangement to blank out the effects of such note signal when pre-pay or remote control is made; together with the recorder means already referred to in connection with other embodiments of the invention;

FIGURE 6 shows schematically an arrangement including a three color lineated receiver screen and a three electron gun receiver arrangement; together with means at the sending station to reverse the order of emission of the three color signals so that in the absence of correction of the order of reception of the signals at the receiver incorrect color effects will be produced in the receiver's screen; together with a reversing switch in the receiver to reverse the order of electron gun excitation, to thus restore reception to a correct order of colors, and pre-pay or remote control means to effect reversal by such switch when pre-pay or remote control operation is made; together with the recorder means already referred to in connection with other embodiments of the invention;

FIGURE 7 shows schematically an arrangement including a single electron gun receiver with means to shift its beam in circular or wave fashion, and including a three color lineated screen to whose lines the electron beam is progressively directed for color reception; and this figure shows the sending station as being provided with switch means to reverse the order of emission of the color signals, and the receiver is provided with a corresponding corrective switch to reverse the order of progress of the electron beam during its rotary or wave-like movements; together with pre-pay or remote control means to effect reversal of the receiver's switch when pre-pay or remote control is effected, and thus to restore correctness of color reception by the receiver; and this figure also shows a recorder embodying the features already referred to in connection with other figures;

FIGURE 8 shows schematically an arrangement of receiver embodying a color lineated screen and a single electron gun, the screen or the kinescope including such screen being rotatable through one hundred eighty degrees, so that the order of color scanning (by horizontal deflections of the electron beam) will be different when such screen is thus rotated from the order of color scanning when the screen is un-rotated; together with means at the sending station to reverse the order of color signals emisssion; the reversal of the receiver screen by the aforesaid rotation bringing such screen into correct color sequence with the sequence of color signals emitted by the sending station; and this arrangement includes switching means to disable the electron gun when the receiver screen is thus rotated, together with pre-pay or remote control means to make ineffective such disabling means when the pre-pay or remote control operation is produced; and this figure also shows a recorder embodying the features already referred to in connection with other figures;

FIGURE 9 shows schematically an arrangement of receiver embodying a color lineated screen and a single electron gun, the screen or the kinescope including such screen being rotatable through ninety degrees so that reception may be made of color signals emitted on either the three dot color array principle, or the color lineated principle, according to certain of the embodiments disclosed in the aforesaid Letters Patent No. 2,755,334, and the sending station is provided with means to enable emission of the color signals on either the three color dot principle or the color lineated principle and with switching means to enable sending the signals according to either of such principles for reception by the receiver when the screen of such receiver is properly rotated to enable such reception; together with switching means to disable the electron beam gun when the receiver's screen is in one rotated position, and pre-pay or remote control means to make such disabling means ineffective when pre-pay or remote control is made; and this figure also shows a recorder embodying the features already referred to in connection with other figures;

FIGURE 10 shows schematically an arrangement of receiver embodying a color lineated screen and a single electron gun, the screen being provided with white or mono-chrome lineations between the color lineations according to certain of the disclosures of the aforesaid Letters Patent No. 2,755,334, and also according to certain disclosures of Letters Patent of the United States No. 2,683,769, issued to me July 13, 1954, together with electrical means to shift the electron beam's scans for excitation of either the color lineations or the white or monochrome lineations for translation of the signals in either true color or in white or monochrome as selected; and in this arrangement the sending station is provided with means to inject a signal, preferably of super-sonic frequency, into the emitted signals when the special program is being emitted, and the receiver is provided with means responsive to such special signal frequency to excite the electrical means which shifts the electron beam to cause it to travel on the white or monochrome lineations and thus to produce a black and white or monochrome translation on the receiver's screen; together with pre-pay or remote control means to make ineffective such beam shifting means and thus to cause translation in true colors; and this figure also shows a recorder embodying the features already referred to in connection with other figures;

FIGURE 11 shows an arrangement similar in some respects to that disclosed in FIGURE 10, including the color lineated screen of the receiver with white or monochrome lineations between the color lineations to enable translation of a program emitted in color signals by either a full color translation or a black and white or monochrome translation; and in this arrangement the electron gun is adjusted to normally deliver its beam onto the white lineations so that a black and white or monochrome translation is produced; together with pre-pay or remote control means to effect shift or registry of the electron beam's excitations to the color lineations when the pre-pay or remote control operation is produced; and this figure also shows a recorder embodying the features already referred to in connection with other figures;

FIGURE 12 shows an arrangement including a receiver having a monochrome or black and white picture screen of conventional form with provision for horizontal and vertical deflections of the electron beam of the single gun; together with means at the sending station in the form of a reversing switch for the vertical deflection elements so that scanning may commence either at the top with downward movement according to conventional practice, or may be reversed, commencing at the bottom and moving upward; and in this arrangement the receiver is provided with a reversing switch for the vertical deflection means to enable corresponding vertical movements of the electron beam either from top to bottom of the screen or from bottom to top thereof; the arrangement being one in which the vertical deflection movements are normally from top to bottom to correspond to conventional emission of the signals by the sending station; together with pre-pay or remote control means for reversing the vertical deflection unit of the received to cause vertical deflections thereof from bottom to top to bring the vertical deflections thereof into harmony with the emitted signals of the sending station; and this figure also shows a recorder embodying the features already referred to in connection with other figures;

FIGURE 13 shows an arrangement including a receiver having a monochrome or black and white picture screen of conventional form with provision for horizontal and vertical deflections of the electron beam of the single gun; and in this embodiment a switch is provided in the receiver for controlling delivery of the controls to the electron gun, said switch being normally closed for gun operation; and in this arrangement provision is made at the sending station to inject a high frequency signal, super-sonic preferably, into the audio signals when a special program is being emitted; and the receiver is provided with an element responsive to such super-sonic frequency with arrangements to then open the switch which controls the electron gun's operations, to kill the electron beam as long as such switch remains open; together with means to permit closing the switch upon pre-pay or remote control being made; and this figure also shows a recorder embodying the features already referred to in connection with other figures;

FIGURE 14 shows an arrangement including a receiver having a monochrome or black and white picture screen of conventional form with provision for horizontal and vertical deflections of the electron beam of the single gun; and in this embodiment a switch is provided in the receiver for controlling delivery of the audio frequency signals to the speaker, said switch being normally closed for speaker operation; and in this arrangement provision is made at the sending station to inject a high frequency signal, super-sonic preferably, into the audio signals when a special program is being emitted; and the receiver is provided with an element responsive to such super-sonic frequency with arrangements to then open the switch which controls the speaker's operations, to kill the speaker operation as long as such switch remains open; together with means to permit closing the switch upon pre-pay or remote control being made; and this figure also shows a recorder embodying the features already referred to in connection with other figures;

FIGURE 15 shows an arrangement including a receiver having a monochrome or black and white picture screen or conventional form with provision for horizontal and vertical deflections of the electron beam of the single gun; and in this embodiment provision is made at the sending station to inject an audio frequency signal into the audio signals when a special program is being emitted; and the receiver is provided with an element for inverting such specially injected audio frequency signal into the speaker system when the effects of such audio frequency signal are to be blanked out from the speaker system; together with arrangements such that normally such audio frequency signal of unpleasant or displeasing and interfering frequency, such as a hum, will be delivered to the speaker when being injected into the signals at the sending station; together with pre-pay or remote control means to bring into effect the inversion produced by such inverter and thus render the objectionable frequency nullified; and this figure also shows a recorder embodying the features already referred to in connection with other figures;

FIGURE 16 shows a radio receiver for sound signals only, of conventional form, either A.M. or F.M., together with means at the sending station to inject an audio frequency signal into the signals being emitted when a special program is being emitted, such audio frequency signal being of objectionable nature and intensity, together with an inverter at the receiver to blank out the effects of such objectionable audio frequency signal, such inverter being normally ineffective so that normally when the objectionable signal is being received it will be delivered to the speaker and produce the objectionable effects; together with pre-pay or remote control means to render the inverter effective to blank out the objectionable audio frequency signal when pre-pay or remote control is made; and this figure also shows a recorder embodying the features already referred to in connection with other figures;

FIGURE 17 shows a radio receiver for sound signals only, of conventional, form, either A.M. or F.M., together with means at the sending station to inject a supersonic frequency signal into the signals being emitted when a special program is being emitted; together with switch means at the receiver to cut out the speaker, such switch means being normally closed to deliver the audio signals to the speaker in conventional manner, and means responsive to the super-sonic signals to open such switch and make the speaker ineffective when such super-sonic signal is being received; together with pre-pay or remote control means to again effect closing of the switch for operation of the speaker when pre-pay or remote control is made; and this figure also shows a recorder embodying the features already referred to in connection with other figures; and FIGURE 18 shows a radio receiver for sound signals only, of conventional form, both A.M. and F.M., with a conventional button or hand knob for selecting the F.M. or the A.M. reception as desired; together with means at the sending station to emit a super-sonic frequency signal and inject it into the emitted signals of F.M. form; together with means responsive to such super-sonic frequency to open the speaker circuit when such super-sonic frequency is being emitted, and means in connection with the button or hand knob to disable such speaker circuit opening means when the receiver is set for reception on the A.M. signals being emitted; and this figure also shows a recorder embodying the features already referred to in connection with other figures.

In the drawings I have shown a recorder in connection with each embodiment of other elements capable of producing the desired operations outlined above. Since all of the recorders thus illustrated in the various embodiments are the same, I shall describe one of them, and the recorders of the other embodiments will carry like numerals for like parts, but with the suffixes *"a," "b," "c,"* etc., corresponding to the several figures 1, 2, 3, etc.

Each recorder includes the supply spool 50 having its ends suitably journalled (not shown), such supply spool carrying a strip of tape of length sufficient to provide for continuous operation for probably thirty to sixty days. At the receiving end of the recorder there is provided a take-up spool 51 capable of receiving the tape as delivered. Means are provided for continuously moving the tape from the spool 50 to the spool 51 at uniform rate of say one inch per hour. In the illustrated embodiments the edges of the tape are regularly perforated as shown at 52, and sprockets 53 carried by the drive shaft 54 engage these perforations at a location intermediate between the two end spools. Uniform rate of drive of the sprockets is ensured by the provision of a small synchronous motor 55 geared or otherwise drivingly connected to the shaft 54 as shown by the broken line 56. A suitable supply of A.C. from the usual service lines (not shown) is provided for such motor.

The tape 57 thus moved through the recorder is provided with a series of longitudinally extending lines 58 corresponding to sending stations from which programs are to be received and for which use recordings are to be made. Preferably there are provided two such lines corresponding to each such sending station, and in the various figures I have therefore shown provision for six such stations, being twelve such lines, and I have legended the corresponding stations by the numerals "1," "2," "3," etc., between the pairs of lines. In order to ensure good take-up of the tape as delivered by the sprockets I have shown the drive belt or like element 59 extending between the drive pulley 60 on the drive shaft and the driven pulley 61 on the shaft of the spool 51. This belt may slip, and the two pulleys are of such relative sizes that even when the spool 51 is empty, at the beginning of an operation, it will rotate fast enough to wind the tape as delivered by the sprockets.

The tape is conveniently of one of the types which are electrosensitive—that is, for example, they suffer discoloration by an electric current delivered to their surfaces by suitable electrodes. One such tape or electrosensitive body is that produced by the E. I. du Pont de Nemours Company, under the tradename of Teledeltos paper. It is used by various recorder manufacturers and users, including the Western Union Telegraph Co., for various recording operations. In the illustrated embodiments I have shown a needle 62 engaging the paper surface for each of the lines 58, and all such needles contact the surface of the paper at points on a line extending across the paper tape at that hour of the day then correct. Thus, in the several figures all of the needles are shown as contacting the tape at the time "10:00." The progress of the tape is in the direction of the arrow shown adjacent to each recorder unit, and as any given needle is electrified with a proper potential D.C. a continuous line of discoloration will be produced by such needle as long as such electrification continues. In the various figures I have indicated various time intervals during which various of the needles were electrified, by the emphasized line sections such as shown at 63. Thereby examination of the tape after use will reveal the several stations from which programs have been received, and also the time intervals during which such receptions occured. Thus a time distribution may be effected as between the several stations, and also it is possible to determine exactly when the program or programs of any given sending station have been received by the receiver in question.

Generally the needles when electrified will be of positive polarity, depending on the nature of the electrosensitive material which they carry. Accordingly, I have in the various figures indicated the frame of the recorder as being of negative polarity. The necessary circuitry is not completely shown, but those portions of circuits necessary to an understanding of the present operations have been shown in each of the figures and will be described hereinafter.

The conventional tuning button of the receiver, by which button the desired stations are tuned, is shown at 64. Its driven shaft is shown at 65. This shaft is shown as carrying the rotatable contacts 66 and 67, each of which will engage six stationary contacts 68 and 69, respectively for the two rotatable contacts. There are six such stationary contacts shown for each rotatable contact; and the stationary contacts for each rotatable contact are distributed around the circle to harmonize with the position of the corresponding rotatable contact for correct tuning to each of the stations for which provision has been made in the equipment. For convenience, only, I have shown such stationary contacts as being uniformly distributed around the 360 degrees of the circle, but manifestly such uniformity of distribution is merely schematic.

The stationary contacts 68 of the rotatable contact 66 connect by the lines 70 to the alternate needles and the stationary contacts 69 of the rotatable contact 67 connect to the intermediate needles by the lines 71. Since the two rotatable contacts are both driven by the same tuning shaft it follows that one pair of adjoining needles is always placed in connection with the rotatable contacts corresponding to a selected station at the same time.

Thus, both of the needles at the sides of the tape stretch 3, for example, are placed at the same time in connection with the rotatable contacts corresponding to station "3."

The rotatable contact 66 is continuously supplied with D.C. by the line 72, so that the tuned position of the receiver is always shown by the discolorations produced at the right-hand sides of the several station bands, "1," "2," "3," etc., of the tape; but said line 72 receives its current from the main switch unit 73, which conveniently is provided with suitable rectifying and other elements when the current supply incoming over the lines 74 is A.C. Thus, discoloration of the tape at the right-hand side of that tape band corresponding to the station then tuned by the position of the button 64 will continue to occur as long as and only as long as the main switch is in closed position. Accordingly, on the assumption that the user of the receiving set customarily turns off the main switch when the receiver is not in service, a complete and correct record will be produced of the various stations to which the receiver has been tuned during the time inerval covered by the tape section being examined, and such record will in itself accurately designate when each given station's program was tuned. This information will enable the auditor or the sponsor, or other person interested in the facts to determine accurately all time uses of the receiver for each station for which provision has been made.

It is now noted that the rotatable contact 67 receives its electrification over the line 75. Until this line is electrified no recording discoloration will be produced by any of the left-hand needles of any pair so that only the right-hand needles will be producing recordings. It is here noted that the line 75 for each embodiment herein disclosed in so connected into the circuits presently to be described for the various special program arrangements, and the pre-pay or remote control elements, that such line 75 will be electrified when, and only as long as the pre-pay or remote control elements are positioned to correspond to their intended pre-pay or remote control uses. It is noted that whenever the receiver is tuned to a sending station from which a special pre-pay program is being emitted, and the proper pre-pay or remote control element has been conditioned for reception of such special program, the line 75 will be electrified, thus electrifying the corresponding needle at the left-hand side of the band representing the tuned station, and thus producing a second discolored line for such station during the time interval of such special program. Such a condition is shown in each of the figures at the time positions of 7:00 to 7:30, 8:00 to 8:30, and 9:30 to 10:00 in the various figures. Accordingly, a record will be produced enabling detailed analysis of the use of the receiver for reception of the special programs, and such detailed recording will enable the monetary receipts of the coin box, or the remote control analyst to be properly distributed among the sponsors of the special programs for which such recording had been made. This is an essential ingredient of proper auditing and to enable the accountants and others to determine to whom and what percentage of total receipts from such special programs shall be delivered.

Since the button or knob 64 is connected to proper tuning elements of the television receiver or the radio receiver as the case may be, I have in each figure shown by the broken line 76 a connection from such knob to such receiver tuning or other elements. These will be considered hereinafter.

In each of the figures illustrating an embodiment of my present invention I have shown a simple form of coin box, 77 having the interior contacts 78 and 79 which will be controlled by the introduction of proper coins or tokens through the slot 80 into such coin box. In certain of the embodiments hereinafter described such contacts are normally closed together—in other embodiments they are normally separated. I have indicated by legends in each case the normal condition of such contacts.

I have also, in each figure, shown schematically, a simple form of remote control switchboard 81 having a series of jack openings 82 into which a suitable plug 83 may be inserted. All of these jack openings are electrified positively, as shown on the various figures. A line 84 is brought to the remote control station from each of the subscribers to the remote control service, such line being connected to the corresponding subscriber's plug 83 as shown in each figure. Accordingly, whenever any given subscriber desires to receive a special program he may notify the remote control attendant of such fact, whereupon such attendant shall insert the plug 83 of such subscriber into the proper socket 82 of the plate 81, thus electrifying the subscriber's line 84 which leads to the equipment presently to be described. The circuitry which will be described is such that the receiver in question may be brought into condition to receive the special programs either by coin-box operation, or by such remote control operation as desired. Of course it will generally happen that any given subscriber will desire the one or the other means of making it possible to receive the special programs, and not both such means; but the arrangements herein to be described are such that any subscriber may be provided with both forms of equipment to render the special programs available to him.

It is noted that the various elements which are interrelated in each of the embodiments now to be described for production of the desired operations, functions, and results, may conveniently be grouped as follows: (A) The sending station, which may in some cases not require alterations or the addition of further elements in order to enable such desired functions and results to be attained; but generally some minor changes or additions to the sending station equipment will be required, as will presently appear. (B) The receiver which will generally require minor alterations or additions of elements to enable attainment of the desired functions and results. (C) The recorder of time use which is a special element. And, finally (D) The pre-pay controls which may properly be included with the recorder as a matter of convenience in relationship and installation.

In FIGURE 1 the sending station is schematically shown as including the three color cameras 85, 86 and 87 to which the light beam reflected from the object 88 is delivered under color division produced in conventional manner by the dichroics 89 and 90, and the reflectors 91 and 92. The signals from such cameras are passed through conventional equipment including the sampler schematically shown at 93, from which sampler the mixed signals for the several colors are sent to the element 94 and thence to the antenna 95 in conventional manner. Included in the circuitry is a reverser switch 96 acting on two of the color lines 97 and 98 leading to the sampler 93, so that when such switch is in one of its two operative positions the order of delivery of the color samples will be G—R—B whereas when the switch is reversed to its other operative position the order of delivery of the color samples will be G—B—R. These two orders of sample or color delivery are shown adjacent to the antenna, indicating the respective sequences in which the color signals will be emitted from the sending station corresponding to the two switch positions. The exact form of such reversing switch unit and the exact circuitry to be used in connection therewith and in connection with the various other electronic elements of the sending station will be a matter of selection by the designer of such equipment, since it is evident that reversal of two of the three color lines (or equivalent operations in the specific sending station being examined) will effect the desired reversal of order of emission of the signals which are passed to the receiver, with corresponding reversal of effects of the receiver's operations. Therefore I do not burden this application with any detailed showing of the circuitry needed to effect such reversals. Normally the order of emission of the signals will, in the illustrated embodiment of FIGURE 1, be that for the down position of the switch, and the reversed order of emission of such signals will be that for the up position of the switch, as legended in FIGURE 1.

The receiver capable of receiving and translating the signals thus emitted with the embodiment of FIGURE 1 may be of conventional color receiver form, for which purpose I have in FIGURE 1 shown such receiver as provided with the three color dot array screen 99, the three electron guns 100, 101 and 102 which are trained to the green dots, the red dots, and the blue dots of the screen, respectively. The conventional mask plate 103 is indicated, and one, only, of its perforations is shown, being the one through which the electron beams are being delivered at the instant illustrated in FIGURE 1. The distributing element 104 is also shown in FIGURE 1 for delivering the signals to the three electron guns corresponding to the received signals. The channel tuner 105 is also shown schematically, being operated by the connection 76 already referred to.

Included in the lines 106, 107 and 108 leading from the distributor element 104 to the respective electron guns is the reversing switch element 109. This switch element serves, when in one position, to deliver the signals from the distributor element 104 to the several electron guns in one order of colors, being that corresponding to the color showings on the screen of FIGURE 1 when the signals are being emitted in the normal sequence corresponding to the normal position of the switch 96 of FIGURE 1. Then, when the switch element 96 of the sending station is reversed, thus reversing the order of emission of the signals for the several colors, it is evident that incorrect excitation of the electron guns of the receiver will occur, since, for example, by transposing the red and the blue at the sending station without corresponding transposition of the electron guns at the receiver, the receiver gun trained on a red dot will be excited when a signal corresponding to blue is being emitted by the sending station, and the receiver gun trained in the blue dot will be excited when a signal corresponding to red is being emitted by the sending station.

By reversing the switch 109 of the receiver to bring its position into harmony with the position of the switch 96 of the sending station correction can be effected in the operation of the receiver's electron guns so that correct color translations will now occur at the receiver, and a true replica will be produced corresponding to the emitted signals. To effect reversal of the receiver switch 104 I have shown the solenoid and armature arrangement 110—111 in FIGURE 1. By proper energization of such solenoid the switch can be reversed and held in reversed position as long as such solenoid is energized. Upon discontinuing such energization the switch will return to its normal condition which corresponds to reception of the color signals and correct delivery of the impulses to the guns corresponding to emission of signals from the sending station when the switch 96 of that sending station is in its normal or non-reversed position. The energization of the solenoid 110 may be effected manually, but for the attainment of certain of the objectives herein disclosed such energization is effected under pre-pay or remote control as follows:

Lines 112 and 113 extend from the contact $78^a$ of the pre-pay coin box $77^a$ to one terminal of the solenoid 110. The other terminal of such solenoid is grounded as shown in FIGURE 1. Accordingly, when a coin or token is deposited in such coin box, thus closing its contacts $78^a$ and $79^a$ together (such contacts being normally separated as legended in FIGURE 1), current will be supplied from the positive line $114^a$ to one end of the solenoid, thus energizing the same. By providing a coin box of the time control type, many of which are available at the present time, the interval during which the contacts $78^a$ and $79^a$ will remain together for a single deposit of coin or token will be limited to that duration required for reception of a program for which payment is intended to be made.

I have also shown in FIGURE 1 another simple relay 115 having the solenoid 116 and the armature 117 as indicated, such armature acting on the movable bridging contact 118 which is related to the stationary contacts 119 and 120. Normally such bridging contact is lowered when the solenoid is not energized, but when the solenoid is energized the two contacts 119 and 120 are bridged together. The remote control line 84 already referred to connects to a line 121 of the equipment now being described, so that whenever the plug 83 is inserted into the plate 81 current will be delivered over the lines 84, 121, and the solenoid 116 to energize the latter. Thus current will also be delivered to the switch solenoid 110 as long as the plug 83 remains in the plate 81. It is thus seen that the pre-pay or remote control will effect reversal of the order of excitation of the electron guns so that the order of their excitation will be brought into harmony with the emission of the color signals from the sending station when the switch 96 of that station is in its reversed position. Thereby a correct color translation will be produced on the receiver's screen corresponding to the special program being sent out over the ether. When the time interval of pre-pay or the time interval of the subscribed for service has elapsed the delivery of current over the line 113 will be terminated and the switch 109 of the receiver will return to its normal position.

Since the electrification of the lines 112 and 113 is coterminal with the duration of the intended special program's reception it is evident that by connecting the contact 67 with such lines 112 and 113 the electrification of the proper needle of the recorder to effect recording of the reception of the special program from the station in question will be possible. Accordingly, I have shown the line 127 (or 75) extending from the lines 112 and 113 to such contact 67.

Referring next to the embodiment shown in FIGURE 2, in this case the recorder elements, the receiver tuning knob and switch elements, including the lines $70^b$ and $71^b$, etc., the sending station elements, including the reversing switch $96^b$, and the receiver three color dot array screen $99^b$ are the same as described in connection with FIGURE 1 for corresponding elements. However, in the present case of FIGURE 2 I have shown a single electron beam gun $123^b$ for delivering its single electron beam to the three color dots of each array in succession, and in selected rotary direction, either counterclockwise as shown by the arrow on the screen in FIGURE 2, or clockwise. For the purpose of producing rotary movement of the electron beam, according to well understood arrangements in this art, I have shown the magnetizing coil $124^b$ through which the beam path extends, such coil being provided with three connections or taps one hundred and twenty degrees apart around the circle, and the lines $125^b$, $126^b$ and $127^b$ are connected to these taps. The unit $128^b$ delivers the color signal impulses in order as determined by the sampler included in such unit, according to the principles of operation already explained in connection with the dot sampler or distributor 104 of FIGURE 1. In the present embodiment of FIGURE 2, however, the two lines $126^b$ and $127^b$ are under reversing control of the switch $109^b$ whose solenoid $110^b$ acts on the armature $111^b$ to effect reversal of the switch when such solenoid is energized. Thus the rotary direction of deflection of the electron beam during its flight across the screen may be and is determined by the position of the switch $109^b$. Rotation of the beam clockwise will excite dots in one order of color—rotation of the beam counterclockwise will excite dots in the other order of color.

In the present instance the switch solenoid $110^b$ is energized under control of either the coin box $77^b$ or the remote control element $81^b$ etc., corresponding to like numbered elements shown in FIGURE 1, with the suffixes "*a*." Thereby the direction of beam rotation during its scan flights across the receiver screen may be brought into harmony with the order of color signals specially emitted by the sending station for the special program, and thus the color translations produced by the receiver will be correctly produced notwithstanding the reversal of the order of emission of color signals at the sending station. Further detailed description of this embodiment is not belived necessary in the light of the more detailed description of the embodiment of FIGURE 1.

The foregoing descriptions of the embodiments shown in FIGURES 1 and 2 reveal arrangements in which the order or sequence of emission of the color signals at the sending station is reversed when a special program is to be emitted, and the receiver is then provided with a corresponding reversing switch arrangement under control of the pre-pay or remote control element so that by either pre-pay or such remote control the reception in proper colors may be effected even when the reversing switch of the sending station is in reversed position. The showings of FIGURES 1 and 2 are of that type of receiver which is provided with three dot color arrays to the dots of which the electron beams or beam are or is directed—in the one case by a three gun arrangement, in the other case by a single gun arrangement with provision for producing the rotary or wave form of flight of the beam across the screen.

Attention is next invited to FIGURES 6 and 7 in which I have disclosed the use of the reverser principle for reversing the order of colors at the sending station when the special program is to be produced, together with reversing switches in the receivers to bring the color reception and translation into harmony with the progress of the colors in the emitted signals. In the cases of FIGURES 6 and 7, however, the screen of the receiver is provided with color lineations instead of the three color dot arrays, the progress of the electron beam across the screen in such case being also across the color lineations so that by proper synchronizing arrangements the beam will effect excitation of the correct color lineation, when a single electron gun is provided (FIGURE 7); and in the arrangement of FIGURE 6 a three gun arrangement is shown, with provision for directing the electron beam of each gun to one of the color lineations, only, of each set of three such lineations. The principle of receiving a series of color dot signals from the sending station and correctly translating them in proper colors at the screen of the receiver when such screen is provided with color lineations instead of microscopic color dots, by causing travel of the electron beam across the lineations instead of along their lengths is fully set forth in my previously mentioned U.S. Letters Patent Nos. 2,683,769 and 2,755,-334.

In the showing of FIGURE 6 the receiver screen is shown at 129. The color lineations are shown extending over such screen in parallel relationship, and with the primary colors repeated regularly in a regularly enforced sequence of the colors. This screen is indicated as being set with the lineations vertical so that as the electron beam scans across the screen by horizontal deflections it crosses the colored lineations in regular repetitive order of color sequence. Since the areas of excitation of the screen at the points of impact of the electron beams against the phosphor surface of the screen are small it follows that small areas of color will be produced by the single electron beam as it traverses the successive color lineations, producing an effect similar in some respects to that produced by the color dot arrangements previously disclosed herein. With the arrangement of FIGURE 6 the three electron beams advance across the screen in regular order and timing with respect to the received signals so that correct or unchanged order of impact of the beams against their color lineations is maintained. It is, however, noted that by reversing the connections to the electron guns, as by use of the switch $109^f$, the switch $96^f$ of the sending station having been reversed, the correct color relationships will be restored in the image produced on the receiver's screen, that color relationship having been previously destroyed by reversal of the switch of the sending station, $96^f$, according to the principles of operation already explained.

The operation of the embodiment shown in FIGURE 6 will be understood from what has previously been described in detail; and in this connection like elements or units shown in FIGURE 6 and other figures are designated by like numerals, with the provision of the suffix "*f*" on FIGURE 6 for such parts thereon shown.

The embodiment shown in FIGURE 7 also incorporates the reversing switch feature hereinbefore described, both as respects the emission of the signals for special programs from the sending station, and their reception at the receiver. Like elements shown in FIGURES 1 and 7 are designated by like numerals but with the suffix "*g*" for the arrangement shown in FIGURE 7. However, the arrangement shown in FIGURE 7 is of the single electron gun type for the receiver, thus bearing similarity to the arrangement shown in FIGURE 2. That similarity has to do with the provision of the means for producing a rotary or wave-like motion of the electron beam during its traverses across the receiver screen; and therefore the elements of FIGURE 7 having to do directly with that feature and which correspond to like elements shown on FIGURE 2 are numbered the same as such elements in FIGURE 2, but with the suffix "*g*." It is not believed necessary to describe the showing of FIGURE 7 in greater detail since the operation thereof will be readily understood from what has been explained hereinbefore.

Reference is next invited to the showings of FIGURES 3 and 4 wherein the receiver screen is again provided with the three color dot arrays shown in other figures. In the scheme of FIGURE 3 provision is made for cutting off the electron beams when pre-pay or remote control has not been made, such operation being produced by injection of a relatively high frequency signal, preferably of super-sonic frequency, into the emitted signals, preferably the audio channel or band, when the special pre-pay program is being emitted. Provision is also made at the receiver for tuning this special signal to produce operation of circuits to shift a switch to position to prevent proper reception until pre-pay or remote control has been made. In the showing of FIGURE 3 such switch when so operated by reception of the special signal, serves to open the electron gun circuits or otherwise disable the operations of such guns, thus preventing reception until the switch is again restored to its un-operated condition notwithstanding the continued reception of such special signal. This result is produced by the pre-pay or remote control operation. In the showing of FIGURE 4 the switch above referred to, when moved to its operated position, serves to connect all of the lines running to the three electron gun controls together so that said lines are all energized in harmony instead of individually as in the normal color operation of the receiver. When so connected together all three of the guns are caused to operate for all received signal conditions for all three colors, so a monochrome reception will be produced on the screen instead of a color reception.

Referring to FIGURE 3 various of the elements therein shown are the same as or similar to like elements shown in FIGURE 1 and have been numbered the same as such elements of FIGURE 1, but with the suffixes "*c*." The principal difference between the showings of FIGURES 1 and 3 lies in the means which is provided for operating the electron beam switch of the receiver, and the exact function performed by that switch as respects the electron beam operations. In the arrangement of FIGURE 1 the reverser switch is provided at the sending station and the switch at the receiver is also a reverser switch to meet and correct for the ill effects produced by the reversals produced at the sending station when proper pre-pay or remote control has been effected at the receiver. In the arrangement of FIGURE 3 there is provided no such reversal switch at the sending station, but instead there is provided an oscillator or equivalent unit, 130$^a$, which will produce, when energized, a relatively high frequency signal, for example, super-sonic of the order of 50,000 cycles/sec. This special signal is injected into the audio band of the sending station for emission when the special program is being put out, for which purpose the unit 130$^c$ is connected into the unit 131$^c$ titled "Audio, etc." The microphone 132$^c$ is also connected to such unit 131$^c$, and the unit 131$^c$ is shown as connected into the unit 94$^c$ from which the total signals are sent to the antenna 95$^c$. A switch 133$^c$ controls operation of the special signal unit so that it can be brought into service only when a special program for which pre-pay or remote control is to be made, is put out. The receiver is provided with means such as a trap to take out the special frequency signal received in its audio unit 134$^c$, over a line 135$^c$, 136$^c$, this line extending to an oscillator 137$^c$ shown as including the inductance 138$^c$ and the capacitance 139$^c$, one or both of which may be adjustable for calibration purposes to bring the unit into proper resonant responding relation to the frequency of the special signal being used. The electron tube 140$^c$ is shown in connection with this oscillator circuit with its grid 141$^c$ anchored to one side of the oscillator circuit so that when a sudden rise of potential occurs in that circuit the grid will be correspondingly affected and thus control the operation of the plate circuit of the tube, including the plate 142$^c$. This tube will have its filament heated at all times when the receiver is turned on, for which purpose proper circuits, not specially illustrated are provided. Thus, whenever a sending station is tuned from which sending station a special program is being emitted, including its special signal just above referred to, such signal will immediately be brought to the oscillator 137$^c$, producing a condition under which the plate 142$^c$ may deliver current to another element of the system. Conversely, whenever a station is tuned from which such special signal is not being emitted no such effect as just explained will be produced at the plate of such receiver's tube.

The resonant response just explained is next communicated to other elements as follows:

A simple relay 143$^c$ is provided, having the solenoid 144$^c$ and the armature 145$^c$. One end of such solenoid is connected by the line 146c to the plate 142$^c$, and the other end of the solenoid is grounded or connected to the return side of the system. A capacitor 147$^c$ is connected across the solenoid to improve the operation if desired. The movable contact 148$^c$ is brought into engagement with the stationary contacts 149$^c$ and 150$^c$ when the relay is energized, thus delivering current from the supply connection marked "+" to the lines 151$^c$ and 152$^c$. The line 151$^c$ connects to the stationary contact 119$^c$ of the relay 115$^c$ instead of such contact being connected directly to the current supply source as in the embodiments shown in FIGURES 1 and 2. In the present embodiment the delivery of current to such contact 119c depends on the energization of the relay 143$^c$ which energization in turn depends on the presence of the special frequency signal from the sending station and contained in the program being tuned. Thus, if when the receiver is tuned to such special program position such program is being emitted the relay 143$^c$ will immediately close and deliver current to the contact 119$^c$ of the relay 115$^c$. Now it is here noted that in the arrangement of FIGURE 3 the relay 115$^c$ is normally closed that is, it is closed when un-energized, whereas in the arrangements of FIGURES 1 and 2 such relay is a normally open relay; and likewise the coin box illustrated in FIGURE 3 is one in which the contacts 78$^c$ and 79$^c$ are normally closed and are separated only when a suitable coin or token is introduced through the slot 80$^c$, whereas in the showings of FIGURES 1 and 2 such coin box is one in which the contacts are normally separated from each other.

Accordingly, as soon as the special frequency signal is received a circuit will be established from the current supply through the contacts of the relay 143$^c$, through the contacts of the relay 115$^c$, and through the contacts of the coin-box, to the line leading to the solenoid 110$^c$ of the switch 109$^c$. This will immediately cut off the signals and controls from the electron guns, thus killing such guns as long as such condition persists. However, as soon as a coin is inserted into the coin box, or as soon as the remote control plug 83$^c$ is inserted into the jack plate 81$^c$ one or both of the relay 115$^c$ and/or the coin box will have its contacts separated thus opening the circuit to the line 112$^c$ and de-energizing the solenoid of the switch, allowing such switch to move to its circuit closing position, and restoring operation of the electron guns.

Now I have also provided a differential relay 153$^c$ having the two solenoids 154$^c$ and 155$^c$ acting on a common armature 156$^c$. These two solenoids are so connected into their circuits that when they are both energized their magneto-motive-forces neutralize each other killing the flux, whereas whenever either of them is energized separately the armature will be raised. The line 75$^c$ which connects to the movable contact 67$^c$ of the series of stationary contacts 69$^c$ is connected to one of the stationary contacts of this relay 153$^c$, the other stationary contact 157$^c$ of such relay connecting to the current supply. Accordingly, as soon as the relay 143$^c$ rises due to the effects of the special signal current will flow through the solenoid 154$^c$ of this differential relay, but at the same time current will flow through the solenoid 155$^c$ which is connected by the line 158$^c$ to the line 112$^c$, it being noted that in the showing of FIGURE 3 the contacts of both the coin-box and the relay 115$^c$ are shown as closed, no pre-pay having yet been made, and the remote control having not been plugged into operation. Accordingly, the relay 153$^c$ will remain down, and current will not yet be supplied over the line 75$^c$ to the contact 67$^c$. Therefore no recordings will yet be made of use time against such special program. As soon, however, as either the pre-pay operation or the remote control operation is produced the line 112$^c$ will be de-electrified, the circuit thereto having been opened either at the coin-box or the remote control relay 115$^c$. Thus, the relay 153$^c$ will rise since its solenoid 154$^c$ will remain energized, and current or potential will be delivered to the contact 67$^c$ and thence to that one of the recorder needles which corresponds to the station now being tuned. Thus recording of time against such special program will now commence and will continue as long as the above recited conditions obtain. Also, the de-electrification of the line 112$^c$ will de-energize the solenoid 110$^c$ of the cut-out switch 109$^c$, thus restoring the operation of the electron guns and producing the desired reproduction on the screen of the television receiver, the special grogram being in effect.

In the embodiment shown in FIGURE 4 the operations are substantially the same as those produced by the embodiment shown in FIGURE 3, with the principal difference that in the FIGURE 4 arrangement the operation of the special signal operated switch 109$^d$ acts to produce an operation of the electron beam guns by which a monochrome reproduction is produced on the receiver screen instead of a true color reproduction. To this end the three lines 106$^d$, 107$^d$, and 108$^d$ leading to the three guns are connected by leads 159$^d$, 160$^d$, and 161$^d$ to the contacts of the switch $109^d$, the stationary contacts of such switch being connected together by the line $162^d$. Accordingly, the potential delivered corresponding to each color signal is transmitted to the guns of all three beams, thus causing all of the guns to excite all of the color dots of each array to which the electron beams are then directed, for each incoming color signal, and all to the same intensity. Thus each incoming signal will produce excitations of all three color dots of each array at the same intensity of excitation, producing a mixing of color emissions which will result in a monochrome translation.

In the embodiment shown in FIGURE 5 I have made provision at the sending station for production af an audio-frequency signal in the nature of a hum or sustained interfering note of audio frequency, e.g., 500 cycles/sec. To this end in FIGURE 5 I have shown at the sending station the microphone $132^e$ feeding into the audio, etc., section, $131^e$. Thence the audio signals are passed in proper form to the section $94^e$ and thence to the antenna $95^e$. A special oscillator unit $163^e$ is provided by which the sustained audio frequency interfering component may be introduced into the emitted signals, preferably in the section $131^e$. A switch unit $164^e$ is provided for bringing the unit $163^e$ into service during the time that a special program is being put out. Thus, during the emission of the special program such objectionable and interfering component is introduced into the audio band and will be received at the receiver and passed through the sound trap $165^e$ to the audio section $166^e$ of the receiver. Normally the full range of signal frequencies translated in the section $166^e$ will be passed over the lines $167^e$ and $168^e$ to the speaker $169^e$, including the interfering frequency component when such component is not blanked out or killed, as hereinafter provided for. When the received program is not a special program there will be no such interfering frequency component present in the signals sent to the speaker. When a special program is emitted the interfering frequency will be present until blanked out or killed as hereinafter to be explained.

I have provided an inverter $170^e$ by which received signals of known frequency are caused to put out signals of opposite potentials and of substantially the same wave form as the received signals and of substantially the same amplitudes as such received signals, and in synchronism and phase with the received signals. Units of this type are well known in the electronic arts and it is not deemed necessary to detail the circuitry of the unit $170^e$ for that reason. In FIGURE 5 I have shown the lines $171^e$ and $172^e$ extending from the unit $166^e$ to such inverter unit $170^e$, but under control of the relay $173^e$. These lines carry the interfering frequency signals from the unit $166^e$ to the inverter unit (under control of such relay). The lines $174^e$ and $175^e$ extend from the relay $173^e$ to the inverter unit. When the relay is in its armature lowered condition, being its normal condition, both of the lines $172^e$ and $171^e$ are un-connected to the corresponding lines $174^e$ and $175^e$, so that the inverting action is not produced. Extending from the inverter unit are the two lines $176^e$ and $177^e$ over which the inverted wave forms are delivered according to the specifications already stated. These lines $176^e$ and $177^e$ connect to the audio lines $167^e$ and $168^e$ which carry the full audio signals from the unit $166^e$ to the speaker, and such connections of the lines $176^e$ and $177^e$ to the lines $167^e$ and $168^e$ are in proper polarity to introduce the inverted wave forms into the lines leading to the speaker in direct opposition to the interfering signals, so that such interfering signals are blanked out or neutralized before entering the speaker itself. Thus the signals actually acting on the speaker unit are devoid of such interfering components as long as the relay $170^e$ is held in its raised armature or closed circuit condition. Such condition is shown in FIGURE 5.

The solenoid $178^e$ of the relay 173e has one end connected to the line $112^e$ which is electrified whenever a coin or token is inserted into the coin box, or the remote control unit is operated. The other end of such solenoid $178^e$ is grounded or connected to the return side of the system. Accordingly, when, and only when, a coin or proper token is inserted into the coin box, or the remote control is properly operated, the relay $173^e$ will have its armature raised to connect the correcting signals into the speaker circuit to blank out the interfering signals.

Attention is next directed to the embodiments shown in FIGURES 8 and 9. In each of these embodiments the receiver screen is provided with color lineations so that a single gun receiver may serve to translate all of the color signals in correct replica. Rotatable supporting means is provided for the lineated color screen in each of the present embodiments, so that by rotating such screen and its lineations, while still causing the lateral deflections of the electron beam to occur in unchanged direction of scan, it is possible to cause the successive beam scans to excite the various color lineations in different manners. Such arrangements are fully disclosed in the aforesaid Letters Patent of the United States issued July 17, 1956, as No. 2,755,334. By such arrangements it is possible to cause the beam scans to either track on the lineations successively, so that each scan will produce a full lineation of the color of the registered lineation, or to cause the scans to cross the successive lineations, so that each beam scan will successively excite all of the lineations thereby producing successive dots of illumination, the colors of the successive dots corresponding to the colors of the lineations as they are crossed by the beam. Thus, by rotating the lineated screen it is possible to produce color reproductions on either the full color line basis or on the color dot basis. For such purposes the screen's rotation should be substantially 90 degrees between its two operating positions. Such an arrangement is shown in FIGURE 9.

Study of the effects produced by a further rotation of the lineated screen through a total of 180 degrees, when the screen is color lineated with three primary colors located in regular order of succession on the face of the screen will show that when the screen is in one non-rotated position and the electron beam is shifted vertically between successive scans, according to conventional present operations, the successive color lineations will be excited in the order green, blue, red, green, blue, red, etc., whereas if the screen be inverted a full 180 degrees while still retaining the original direction of scans, and still retaining the same vertical direction of beam deflections, the color order in which the successive lineations are scanned will become reversed and will now be green, red, blue, green, red, blue, etc., in the assumed cases. Such an arrangement of provision for complete screen inversion is shown in FIGURE 8.

Referring now to FIGURE 8, the rotatable kinescope screen is shown at $179^h$, and in that showing the lineations are horizontal and the beam scans are parallel to such lineations and register therewith. The colors produced when the successive lineations are scanned are shown at the ends of the lineations by the legends "G," "R," and "B," corresponding to green, red, and blue, respectively. Study of that lineated screen will show that when it is in the rotated position shown in the figure, and with the vertical beam deflections from top to bottom, the order of color scanning will be green, red, blue, green, red, blue, etc. Accordingly, if the sending station is sending out signals for color translation in that order of the colors, the receiver will be able to correctly translate such signals as far as color sequence is concerned. If, however, either the order of color sequence be other than that just recited, or the screen be inverted, incorrect color reception and translation on the screen will result. Then correct color translation may be produced by inverting the screen so as to produce proper color synchronizing of the replica on the screen with the object being examined by the sending station camera or cameras.

The screen shown in FIGURE 8 is provided with an outwardly extending stop 180$^h$ which will engage a stationary stop 181$^h$ when the screen is in its normal or unrotated condition (it being shown in its rotated position in FIGURE 8). In such unrotated condition the order of color lineation sequence for vertical beam deflections from top to bottom will correspond to the order of color sequence of the signals emitted from the sending station for "ordinary" or non-pre-pay programs.

The sending station is provided with the reversing switch 96$^h$, and with a "sampler" 182$^h$ which causes the sending station to emit a full line of each color instead of the mixed colors for dots according to present conventional color operation. That is, the sampler indicated in FIGURE 8 (and also in FIGURE 9) is one in which each "dot" is the full length of a scan across the object being examined by the camera. The reversing switch 96$^h$ thus serves to reverse the order of emission of the color lineation scans occurring in the sending station, so that when a special program is to be broadcast it may be so broadcast in color, but with the sequence of the colors reversed from the conventional sequence. Thereupon, if the screen of the receiver be in its "normal" or non-rotated position (180 degrees counterclockwise from its position in FIGURE 8) the color sequence produced on such screen by the reversed order sequence from such station will produce a replica in improper colors, and unacceptable.

Under the foregoing unacceptable conditions the screen may be rotated clockwise through 180 degrees to the position shown in FIGURE 8, thus carrying the stop or lug 180$^h$ away from the stationary stop 181$^h$ and against another stop 182$^h$. This stop 182$^h$ is an electrical contact as shown in FIGURE 8. In the circuitry shown in this figure such stop is a ground connection. The receiver is provided with an electron beam cut-off switch 183$^h$ which is normally closed, but which may be opened by exciting the solenoid 184$^h$ as shown in FIGURE 8. Provision is made for restoring the electron beam when pre-pay or remote control operation is produced, and also for properly exciting or electrifying the contact 67$^h$ so that correct recording of the use time of the receiver during special program reception will be made. To this end the following elements have been shown in FIGURE 8:

The solenoid 144$^h$ of the relay 143$^h$ has one end connected to the current supply. Its other end connects by the line 185$^h$ to the stop or lug 180$^h$ by means of a flexible lead or "pig-tail" 186$^h$ so that connection is maintained during the rotations of the screen 179$^h$. Accordingly, when such screen reaches its rotated position, shown in FIGURE 8 to bring its lug 180$^h$ against the stop contact 182$^h$ the solenoid 144$^h$ is energized, thus raising its armature and contact 148$^h$ and closing the circuit controlled thereby. That circuit includes the contacts of the relay 115$^h$ which relay is controlled by the remote control unit, and includes the contacts of the coin-box all of which contacts are normally closed together as shown in FIGURE 8. Thus, when the relay 143$^h$ is energized by the completion of the 180 degree clockwise rotation of the screen, current is delivered over the line 112$^h$ to the solenoid 184$^h$ of the relay 183$^h$, thereby cutting off the electron beam and killing the production of the picture on the television screen. Upon then making pre-pay to the coin-box, or producing proper remote control operation, supply of current to the line 112$^h$ will be stopped with corresponding restoration of the electron beam's operation, and production of the desired special program reception.

Next referring to FIGURE 9, I have therein shown an embodiment in which the lineated color screen may be rotated through substantially ninety degrees between a full color line scanning portion and a rotated position in which the electron beam scans across the color lineations at substantially ninety degrees (shown in FIGURE 9). When so rotated such receiver screen is capable of receiving and translating in color the incoming signals emitted on the "dot" principle by properly synchronizing the traverse of the electron beam with the successive color lineations during the horizontal deflection traverses of the beam. Then, by providing the sending station with means to emit the color programs either on the full color line principle, or the "color dot" principle, either kind of these two programs may be received and translated properly on the receiver screen under the arrangements just above stated.

In FIGURE 9 various of the elements are shown which have already been described. However, in the present case the color lineated screen is provided with a segmental contact which is connected to the negative or ground side of the electrical system by the flexible lead or "pig-tail" 187$^i$. A stationary contact 188$^i$ is supported in position to make contact with this segmental contact during almost the full ninety degrees of screen rotation, and to break such contact just prior to return of the screen to its normal or un-rotated condition in which the beam scans are along the lineations and not across them. In FIGURE 9 the screen is shown in its rotated position so that each scan will cross all of the lineations in color succession.

In the present embodiment I have provided the switch unit 183$^i$ having the operating solenoid 184$^i$ which when energized opens the switch during the interval of such energization, only. In the present case as soon as a slight rotational movement from the horizontal alignment of the color lineations has occurred, the segmental contact 187$^i$ will engage the stationary contact 188$^i$ thus energizing the solenoid 144$^i$ of the relay 143$^i$ and delivering current to the switch solenoid 184$^i$ to open the switch, the pre-pay coin-box contacts 78$^i$ and 79$^i$ being together since pre-pay has not yet been made, and the remote control unit having not been operated to energize the relay 115$^i$. Thus, the rotation of the lineated color screen from its normal horizontal lineations position serves to cause opening of the electron beam control switch and produces cutting off of the electron beam with extinguishment of the screen translation. This condition will continue until either a pre-pay operation has been made, or until the remote control unit has been properly operated.

The sending station operating with this embodiment is provided with means to emit signals on either the full color line principle or the "dots" principle, both of which are well known in this art. In FIGURE 9 I have shown schematically a sending arrangement by which a simple switching operation will transfer the emitted signals from the full color line operation to the dot type operation as required. Assuming that the normal operation is on the full color line principle a special program for which pre-pay would be required would be emitted on the dot principle, thus requiring rotation of the receiver screen to the position shown in FIGURE 9, and requiring either pre-pay or remote control to receive such special program correctly. Thus, in FIGURE 9 I have shown the two samplers 189$^i$ and 190$^i$ (both included under the numeral 93$^i$), and both timed with the operation of the other elements of the system. During operation the sampler 189$^i$ will deliver sustained impulses of duration equal to the scan time for the cameras to make a full cross scan; during such operation the sampler 190$^i$ will make many samples of the "highs" for the several colors in succession, and according to well understood principles known in this art. The two delivery lines 191$^i$ and 192$^i$ deliver the two kinds of samples to the stationary contacts of the switch unit 193$^i$, so that by shifting this switch unit to the proper position either kind of emission of the color signals can be produced as needed.

It is believed that the functioning of this embodiment will be clearly understood from the foregoing explanations.

Referring next to the embodiments shown in FIGURES 10 and 11, in these embodiments I have shown means to produce the replica either in black and white or monochrome, or in color as selected; and specifically the arrangements shown in these figures incorporate the principle of three color lineations extending across the receiver screen and parallel to each other and interspaced according to a regular order of colors succession, together with interlines of white. By shifting the "frame" of the raster slightly in direction across these lineations it is possible to cause the electron beam to travel either on the successive white lines or on the color lines, and in the latter case, by proper controls to effect color translation in harmony with signals emitted from the broadcasting station on the full color line principle. Subordinate to this broad principle are the following further features:

When it is desired to effect the television or radio operations on the principle that one form or kind of reception shall be available without pre-pay and another form or kind of reception may be had upon payment of a fee for such service, such other form or kind of reception generally being of a superior quality but not necessarily so, the arrangements may be of either of two kinds when color sending and color translation are incorporated in the scheme of operations. Thus, under one scheme provision may be made such that the regular color programs may also be received in full color, not being pre-pay programs, and when a special program is being sent out by the broadcasting station in color the operation of the receiver shall be disabled for color reception, but such special program may still, and without pre-pay be received in black and white or monochrome. Under this arrangement the "frame" of the receiver will normally be adjusted to cause the electron beam to ride or track the color lineations; and when a special color program is being emitted the arrangements shall include means to automatically shift the tracking of the electron beam to the white lineations so as to produce the raster in black and white or monochrome. Then, if it be desired to restore the color translation of such special program this may be done by the pre-pay or remote control operation, which will shift the tracking of the electron beam back onto the color lines when such pre-pay or remote control operation has been produced. Under the other scheme of operation the receiver adjustments are such that normally and without pre-pay the electron beam tracks on the white lineations of the receiver screen, so that black and white or monochrome translation is produced for any program being received, whether such program be one of monochrome signals or color signals, and whether the color signals be for a normal program or a special program. Then, to receive the special program in color pre-pay or remote control shall be operated, whereupon the tracking of the electron beam will be shifted to the color lineations and the reception of such program will be in color. In fact, this arrangement can be used to enable color translation for any program which is sent out as color signals.

Referring first to FIGURE 10, the arrangements therein shown include the provision for mixing a special high-frequency (for audio) signal into the audio signals sent out from the sending station when a special program is being emitted. This principle has been fully explained and the means to produce such results described previously hereinafter so it is not deemed necessary to repeat such explanations here. However, the switch 133$^j$ is provided for controlling the injection of such special inaudible signals into the train of signals being emitted. Likewise, at the receiver I have shown elements and means for using such special signals when so produced and so received to effect operation of a relay through the medium of an oscillator arrangement tuned to detect and function when such special frequency signal is arriving. Thus, during reception of such special signal the line 112$^j$ is electrified; but such line, instead of controlling a cut-out switch as in the arrangement of FIGURE 3, serves the "frame shifting" solenoid 194$^j$ (schematically shown adjacent to the lineated screen) (see FIGURE 10) so that as long as such solenoid is energized the electron beam scans are caused to ride on the white lineations, thus producing a black and white or monochrome translation; it being noted that the adjustments are such that normally and in the absence of such special signal reception, and in the absence of the energization of such solenoid 194$^j$ the beam scans will track on the color lineations, and thus produce the desired color translation, it being understood that the sending station is emitting its signals on the color basis.

Upon opening the circuit connection delivering current to the line 112$^j$, such opening being effected either by the pre-pay operation or by the remote control, the solenoid 194$^j$ will be de-energized and the electron beam will again track on the color lineations to produce the raster in color. Further description of this embodiment is believed unnecessary at this point.

Next referring to FIGURE 11, I have therein shown a receiver screen similar to that shown in FIGURE 10, being provided with the white lineations between the successive color lineations so that reception and translation may be in either black and white or monochrome as selected. In the present case, however, the reception is normally produced on the white lies, the tracking of the electron beam scans being adjusted and the "frames" being adjusted, to ensure that result. The frame shifting solenoid 194$^k$ is provided which, when energized serves to shift the frame position slightly so that tracking will then occur on the color lineations. Manifestly, if desired the arrangement might be reversed, normal tracking being on the color lineations, and shift of the frame bringing about tracking on the white lineations. Under these conditions the connection to the pre-pay and remote controls would probably be reversed so that the tracking on the color lineations would continue normally and shift would be made to the white lineations. In FIGURE 11 I have shown the relay 115$^k$ normally open, and the coin-box unit 77$^k$ having its contacts normally open, are provided to control energization of the line 112$^k$ leading to such solenoid 194$^k$ so that either the coin-box operation or the remote control operation will effect energization of the solenoid 194$^k$ to effect shift of the tracking to the color lineations whenever desired, as when a special program is being received; but it is here noted that with this arrangement, and when tracking is normally on the white lineations a black and white or monochrome translation will be produced when a program is being received, and regardless of whether such program's signals are being emitted on the color basis or as monochrome. Then, when it may be desired to receive in color the solenoid 194$^k$ must be energized either by pre-pay or remote control operation. It is also here noted that the embodiment shown in FIGURE 11 does not require any special equipment at the location of the sending station to effect the desired and proper discrimination between the receptions of the color signals and those for black and white, or monochrome, when the arrangement is such that reception is normally on the white lines scanning.

Next, in FIGURES 12, 13, 14 and 15 I have shown embodiments of my invention wherein the receiver's screen is of the conventional monochrome type, but wherein it is desired to be able to so control the reception when a special program is being emitted that a pre-pay or remote control operation must be performed to receive an acceptable replica on the receiver's screen.

Referring first to FIGURE 12, in that arrangement I have provided a reversing switch in the equipment at the sending station whereby the vertical deflections may be produced either from top to bottom according to conventional practice, or from bottom to top during the camera's operations, and I have also provided a reversing switch to control the vertical deflections produced in the receiver, either from top to bottom according to present conventional practice, or from bottom to top to conform with the vertical deflections being produced at the sending station which is being tuned. To these ends the horizontal and vertical deflecting elements at the sending station are shown by the solenoids 195[1] and 196[1], respectively, and the sending station is shown as provided with the reversing switch 197[1] by which the deflections vertically at the sending station may be effected in direction desired. The object being examined by the camera is shown at 198[1], whereon the horizontal scanned areas are also shown by the horizontal lines. Otherwise than by the provision of such reversing switch for the vertical deflections the equipment at the sending station may be along conventional lines in practice at the present time.

The horizontal and vertical deflecting means at the receiver are shown by the solenoids 199[1] and 200[1], respectively. The reversing switch 201[1] is also shown at the receiver connected to the vertical deflecting means 200[1] in such manner that normally that deflecting means acts to produce the scans across the receiver screen commencing at the top and moving down to the bottom of the screen, according to conventional present practice. I have also, in FIGURE 12, shown the relay 115[1] controlled by the remote control unit 81[1], and the pre-pay coin-box unit 77[1] such as previously referred to herein. it is here noted that in the layout shown in this figure the contacts of both such relay and of the coin-box are normally separated so that the circuit controlled by these elements which are in parallel connection with each other is normally open as legended on the figure. The line 112[1] extending from these units leads to the solenoid 110[1] of the reversing switch 2011 of the receiver and which reversing switch serves the vertical deflection unit 200[1], so that when such line 112[1] is electrified the reversing switch is moved to its reversed condition. Thus reversal of the direction of the vertical deflections is effected by either the pre-pay coin-box or the remote control or both as desired.

It need be further commented only that when the signals are emitted from the sending station with its switch 197[1] reversed, the receiver switch 201[1] being un-reversed, the picture produced on the receiver screen will be upside down, which is of course an unacceptable replica, and that in order to restore such picture to its proper right-side-up condition it is necessary either to make a pre-pay operation or a remote control operation.

Referring next to the embodiment shown in FIGURE 13, in this case the receiver is provided with an electron beam cut-out switch 183$^m$ whose solenoid 184$^m$ is controlled by the reception of a high frequency component carried by the audio band from a generator at the sending station according to the principles already described in connection with other figures. A frequency responsive circuitry is provided, including the frequency responsive oscillator system to act when such special signal component is carried from the sending station, and provide an operating current to energize the switch solenoid 184$^m$ and open the electron beam circuit. Pre-pay or remote control then will act to cut off the current from the switch solenoid and allow it to re-close, thus restoring the electron beam operation. Further description of this arrangement is not deemed necessary due to the detailed description of corresponding elements earlier in this specification. It is, however, noted that the receiver screen 202$^m$ in this embodiment is shown as being a monochrome receiver screen, thus disclosing certain of the features of invention herein disclosed as they may be used in monochrome receiver operations as well as in color receivers.

Next, the embodiment shown in FIGURE 14 is similar to that just described, FIGURE 13, but in the present case of FIGURE 14, the switch unit 183$^n$ controls delivery of audio signals to the speaker, in such manner that the speaker is cut out of service when a special program is being received containing the special high frequency (audio) component injected into the signals being emitted by such sending station. The pre-pay operation or the remote control operation serves to restore the speaker circuit to operation, and the scheme disclosed in this figure is the same as that disclosed in FIGURE 14 with the exception that in the present case the cut-out is effected on the speaker circuit instead of the electron beam circuit.

The arrangement shown in FIGURE 15 is similar to that shown in FIGURE 5, wherein an interfering frequency signal is injected into the signals emitted at the sending station when a special program is being sent out; and at the receiver there is provided an inverter by which the effects of such objectionable component contained in the audio reception can be neutralized or blanked out when pre-pay or remote control has been made. This FIGURE 15 disclosure applies that principle to the case of a monochrome emitted signal and a monochrome reception at the receiver's screen.

FIGURE 16 shows an embodiment of features of my in vention applied to the transmission and reception of radio signals for sound alone as distinguished from television signalling primarily. In the case of this FIGURE 16 the desired controls of the speaker when a special radio program is being sent out are based on the injection of the objectionable frequency component (for example, 500 cycles/sec.) into the emitted signals when the special program is being emitted, together with provision of an inverter to blank out or neutralize such objectionable component when pre-pay or remote control is effected.

FIGURE 17 also discloses an embodiment relating to the desired control of radio (audio) signals, only, and in the present case provision is made for injection of the high (preferably super-sonic) frequency signals into the signals emitted from the sending station, together with means at the receiver to respond to such frequency and thereby cut out the speaker; and means to neutralize or destroy the effect of such operation when pre-pay or remote control is made by then again causing delivery of the audio signals to the speaker.

FIGURE 18 shows an embodiment wherein the pre-pay principle is applied to a radio sending and receiving system wherein two or more sets of signals for audio reception are being simultaneously emitted from a sending station, one of such sets preferably being F.M. and the other A.M. in principle; and wherein a special program is being sent out through one of such sets of signals, preferably the F.M. set. Provision is made for cutting off reception through the speaker when such special program is being sent out over its set of signals, and for restoring the speaker operation for such set of signals (being the special program then in progress) by pre-pay or remote control operation. These results may be secured when both sets of signals from such station, F.M. and A.M., are tuned at the receiver with the tuning button set at substantially the same position, the selector button for selecting between F.M. and A.M. reception being set to its proper position for the desired type of reception. Under the above circumstances, either type of reception being secured when the tuning element or button is set to the correct position for the station in question, depending on the setting of the selector button, it is evident that special provision must be made to ensure proper and correct operation of the recorder's styli for such station so that, for example, when the selector button is set for A.M. reception proper recording will be effected for the normal recording operations, and so that when the selector button is set to the F.M. position for reception of the special program then being sent out over F.M. but requiring pre-pay to produce reception, the recorder's stylus for recording reception for the F.M. condition will not function until the pre-pay or remote control has been made.

To meet the requirements of the present operations I have, in FIGURE 18, shown an embodiment similar in principle to that shown in FIGURE 17 wherein a special high frequency (audio) signal is injected into the signals emitted at the sending station, such signal causing the speaker control switch to open when the sending station in question is tuned in by the tuning button of the radio receiver, (the selector switch being set to its F.M. reception position) thus cutting off speaker operation until pre-pay or remote control has been made. But since, with the receiver tuned to such sending station it may be desired to receive a non-pre-pay program also arriving on the same or substantially the same channel of carrier frequency and being emitted according to A.M., it becomes necessary to make provision for again restoring speaker operation even when such special signal is producing resonance in the control circuit already described in connection with the showings of various figures. Accordingly, in FIGURE 18 I have shown the selector button 203$^r$ by which the reception and translation at the receiver may be selectively on either the F.M. or the A.M. principle, the tuning button having been tuned to the sending station position, and assuming that the same tuning position of such tuning button is correct for both F.M. and A.M. signals received from such station. The selector shaft 204$^r$ which is rotated by this button 203$^r$ has geared to it the rotary contactor element 205$^r$ having a segmental contact 206$^r$ (insulated from the body of such element 205$^r$) so that shift of the selector button to select the kind or reception desired shifts such segmental contact in one direction or the other. Two stationary contacts 207$^r$ and 208$^r$ are mounted in position so that when the selector button is in its F.M. position (as indicated by the pointer 209$^r$) these stationary contacts are not bridged by such segmental contact, whereas when the selector button is in its A.M. position the segmental contact bridges the stationary contacts. These stationary contacts are connected to the two stationary contacts 210$^r$ and 211$^r$ of the cut-out switch 183$^r$, or to the lines connected to such contacts, so that the cut-out switch is bridged whenever the selector button is in its A.M. position, thus restoring speaker operation even when the special high frequency signal (audio) is being received over the channel of such sending station. Whenever the selector button is shifted to its F.M. position such bridging is terminated, thus ensuring proper speaker cut-out for the F.M. reception until the pre-pay or the remote control is effected, if a special program is arriving over the F.M.

Since the various elements shown in FIGURE 18, and their functions, other than those related to such provision to enable reception on the A.M. principle without pre-pay, are fully described in connection with other embodiments, it is not deemed necessary to repeat such descriptions here.

It is noted that in each of a number of the embodiments herein disclosed the television reception produced without pre-pay or remote control operation is of a form and kind which is completely intelligible although not of as high a grade of program production, according to some standards of comparison, as the grade of reception produced when such pre-pay or remote control operation is in effect. It is also noted that I have disclosed the foregoing in an operation wherein no change is required at the sending station to make possible such discrimination between two grades of reception by the receiver, the only operation at the receiver being that needed for effecting pre-pay or remote control. This embodiment of the present features of invention is herein shown in connection with the recording means, and with provision for producing a record of the receiver use when pre-pay or remote control operation has been made or produced.

I claim:

1. A system for the transmission of intelligence from a sending station to a receiving station wherein the sending station includes means to produce and emit a pattern of signals corresponding to successive elements of the intelligence to be transmitted, and wherein the receiving station includes means to receive and translate said signals, said translating means including means to selectively produce and present to the user of the receiving station either of two intelligible interpretation patterns of such received signals, being a first grade interpretation pattern and a second grade interpretation pattern, both of which interpretation patterns are intelligible replicas of the intelligence represented by the signals transmitted from the sending station, said interpretation and presenting means including means to select either interpretation, together with means to make a record of the use of the receiving station which record shows the grade of the interpretation so recorded, said record making means including a tape, means to support the tape, means to advance the tape lengthwise at substantially uniform speed, a recording stylus corresponding to each of the interpretation patterns of said grades of replica, both of said styli being engageable with the surface of the tape, connections between the means to receive and translate the received signals, and said record making means, said connections including means to activate each stylus during replica interpretation of the grade pattern corresponding to such stylus, said activating means including operative means constituted to cause such stylus to produce a record on the tape during such activation of such stylus, the means which activates the stylus corresponding to the first grade interpretation including stylus activation starting and stopping means constituted to cause said stylus to produce its record only during intervals of first grade interpretation, and the means which activates the stylus corresponding to the second grade interpretation including stylus activation starting and stopping means constituted to cause said stylus to produce its record during intervals of second grade interpretation.

2. Means as defined in claim 1, wherein the sending station emits a carrier wave frequency and band, and wherein the receiving station means to receive and translate the signals emitted by the sending station includes means to tune to such carrier wave frequency and band, said tuning means including a movable tuning element having a station position corresponding to the sending station aforesaid, and connections between the stylus for second grade interpretation and the means to tune such carrier wave frequency, said connections including a movable element having a stylus activating position and a stylus non-activating position, said connections including means to move said movable element to its stylus activating position when the tuning element is at said tuning position and to move said movable element to its stylus non-activating position when the tuning element is moved from said tuning position.

3. Means as defined in claim 1, wherein the record tape is electro-sensitive, and wherein the activation of a stylus comprises electrification of said stylus and wherein the surface of such tape is characterized by discoloration produced by electrification of a stylus in contact with such tape surface.

4. Means as defined in claim 3, wherein the degree of discoloration of the tape surface produced by electrification of the styli in contact with the tape surface corresponds to the voltage of current applied to such styli.

5. Means as defined in claim 1, wherein the means to drive the tape at substantially uniform speed comprises a tape driving motor.

6. Means as defined in claim 5, wherein the tape driving motor comprises a synchronous motor.

7. Means as defined in claim 1, wherein the connections between the means which receives and translates the received signals, and the record making means, includes means to produce and present to the user of such receiving station the second grade interpretation when the receiver receives and translates the signals emitted corresponding to the successive elements of the intelligence being transmitted, and wherein said connections between the means which receives and translates the received signals, and the record making means, include an activating element movable between a first grade non-interpretation and first grade stylus non-activation position and a first grade interpretation and first grade stylus activation position, and means to selectively move said movable activating element to said first grade interpretation and first grade stylus activation position or to said first grade non-interpretation and first grade stylus non-activation position.

8. Means as defined in claim 7, wherein said movable activating element includes a coin actuated element movable between said first grade non-interpretation and stylus non-activation position and said first grade interpretation and first grade stylus activation position.

9. Means as defined in claim 7, wherein said movable activating element comprises a remote control device.

10. In an intelligence receiving and translating system the combination of a receiving and translating unit for the reception and intelligible translation of incoming signals carried by a plurality of distinct carrier wave frequencies and bands, said receiving unit including movable means to tune the reception to any selected carrier wave frequency and band, said movable tuning means having tuning positions corresponding to the tuning of selected carrier wave frequencies and bands to be individually tuned, and means to produce a continuous record of the receiving and translating operations produced by said receiving and translating unit, said record producing means including a tape having an electro-sensitive surface, means to support the tape, means to advance the tape at substantially uniform speed, a plurality of electrically conducting styli in contact with the electro-sensitive surface of the tape at successive locations across the width of the tape, said styli individually corresponding to selected carrier wave frequencies and bands of which use recordings are to be made, switch means to activate the styli individually corresponding to said tuning positions of the movable tuning means, said switch means including styli activating elements corresponding to the styli aforesaid, styli activating connections from said activating elements to the styli to which said elements correspond, and movable means to electrically activate the activating elements individually, together with an operative connection between said movable means and the movable tuning means, said connection being constituted to move the movable means to position to electrically activate the activating element for the stylus which corresponds to the carrier wave frequency and band at each tuning position of said movable tuning means.

11. Means as defined in claim 10, wherein the surface of the electro-sensitive tape is characterized by discoloration produced by electrification of the styli in contact with such tape surface.

12. Means as defined in claim 11, wherein the degree of discoloration of the tape surface produced by electrification of the styli in contact with the tape surface corresponds to the voltage of current applied to such styli.

13. In the art of transmission of intelligence from a sending station for reception and intelligible translation by a receiving station as a color raster, wherein the sending station includes means to produce and emit signals corresponding to the color intensities of the elemental areas in successive cycles of elemental areas of an object in a repetitive pattern of signals corresponding to said elemental areas, and wherein said elemental areas of the repetitive pattern comprise dots and each cycle comprises an array of said dots, each array including dots for a plurality of primary colors, and all of the cycles of signals corresponding to the elemental areas in the same color sequence, means to determine the order of emission of the signals corresponding to the elemental areas contained in the aforesaid cycles, including means to reverse said order of emission of said signals.

14. Means as defined in claim 13, together with means to receive and translate said signals for production of an intelligible raster, said receiving and translating means including an electron gun corresponding to each of the primary colors, means to activate the electron guns in cycles of activation corresponding to the cycles of the signals emitted by the sending station, each such cycle of electron gun activations including activation of the electron guns in a selected sequence, and means to reverse the sequence of activation of the electron guns.

15. Means as defined in claim 14, wherein the signal translating means includes an electron beam excitable screen having elemental areas constituted to produce illumination under such excitation, said elemental areas comprising arrays corresponding to the arrays of the elemental areas for which the signals are emitted by the sending station, the elemental areas of each array of the excitable screen of the translating means producing illuminations in the same color sequence for a selected order of cyclic excitation of said elemental areas by the electron gun activations.

16. Means as defined in claim 15, wherein the elemental areas of the excitable screen comprise dots of screen area.

17. Means as defined in claim 15, wherein the elemental areas of the excitable screen comprise electron beam excited dots of color lineations.

18. Means as defined in claim 13, together with means to receive and translate said signals for production of an intelligible raster, said receiving and translating means including a single electron gun, means to cause the electron beam of said gun to execute horizontal deflections including rotary components of motion in said deflections, and means to reverse the rotary components of said deflections.

19. Means as defined in claim 18, wherein the signal translating means includes an electron beam excitable screen having elemental areas constituted to produce illumination under such excitation, said elemental areas comprising arrays corresponding to the arrays of the elemental areas for which the signals are emitted by the sending station, the elemental areas of each array of the excitable screen of the translating means producing illuminations in the same color sequence for a selected order of cyclic excitation of said elemental areas by the electron beam activations.

20. Means as defined in claim 19, wherein the elemental areas of the excitable screen comprise dots of screen area.

21. Means as defined in claim 19, wherein the elemental areas of the excitable screen comprise electron beam excited dots of color lineations.

22. In the art of transmission of intelligence from a sending station for reception and intelligible translation by a receiving station as a color raster, wherein the sending station includes means to produce and emit signals corresponding to the color intensities of the elemental areas in successive cycles of elemental areas of an object in a repetitive pattern of signals corresponding to said elemental areas, and wherein said elemental areas of the repetitive pattern comprise lineations and each cycle comprises a group of said lineations, each group including lineations for a plurality of primary colors, and all of the cycles of signals corresponding to the elemental areas of the same color sequence, means to determine the order of emission of the signals corresponding to the elemental areas contained in the aforesaid cycles, including means to reverse said order of emission of said signals.

23. Means as defined in claim 22, together with means to receive and translate said signals for production of an intelligible raster, said receiving and translating means including a single electron gun, and means to cause the electron beam of said gun to execute horizontal deflections.

24. Means as defined in claim 23, wherein the signal translating means includes an electron beam excitable screen having elemental areas constituted to produce illumination under such excitation, said elemental areas comprising arrays corresponding to the arrays of the elemental areas for which the signals are emitted by the sending station, the elemental areas of each array of the excitable screen of the translating means producing illumination in the same color sequence for a selected order of cyclic excitation of said elemental areas by the electron beam activations.

25. Means as defined in claim 24, wherein the elemental areas of the excitable screen comprise lineations.

26. Means as defined in claim 25, wherein the electron beam excitable screen is invertable top for bottom.

27. In the art of transmission of intelligence from a sending station for reception and intelligible translation by a receiving station as a raster, wherein the sending station includes means to produce and emit signals corresponding to the intensities of illumination of the elemental areas in successive cycles of elemental areas of an object in a repetitive pattern of signals corresponding to said elemental areas, and wherein said elemental areas of the repetitive pattern are in lineations extending horizontally, and wherein the successive horizontal lineations are at vertical locations progressively higher or lower in said pattern, means to determine the order of progress of the successive horizontal lineations in their vertical locations, including means to reverse said order of progress of the successive horizontal lineations in the vertical direction.

28. Means as defined in claim 27, together with means to receive and translate said signals for production of an intelligible raster, said receiving and translating means including means to produce elemental area horizontal lineations of illumination corresponding to the horizontally extending elemental area lineations signalled by the sending station, means to produce the elemental area horizontal lineations of illumination of the raster at vertical locations progressively higher or lower in the raster, means to determine the order of progress of the elemental area lineations vertically, and means to reverse the direction of said order of progress vertically.

29. Means as defined in claim 28, wherein the elemental area lineations of illumination in the raster are monochrome illuminations.

30. Means as defined in claim 28, wherein the means to produce the elemental area horizontal lineations of illumination comprises an electron gun and a surface excitable by the electron beam produced by said electron gun, together with means to cause variation of the strength of the electron beam according to the variation of strength of the signals emitted by the sending station, and wherein the receiver includes means to produce vertical deflection of the electron beam to locations corresponding to the vertical locations of the successive elemental area lineations signalled by the sending station.

31. In the art of transmission of intelligence from a sending station for reception and intelligible translation by a receiving station as a color raster, wherein the sending station includes means to produce and emit signals corresponding to the color intensities of the elemental areas in successive cycles of elemental areas of an object in a repetitive pattern of signals corresponding to said elemental areas, means to produce such pattern comprising the cycles wherein each cycle includes an array of dots, each array including dots for a plurality of primary colors, and means to produce such pattern comprising cycles wherein each cycle includes a plurality of lineations, wherein the lineations of such cycle include lineations for a plurality of primary colors, and means to cause production of the signals corresponding to the pattern which includes cycles of dots, or corresponding to the pattern which includes cycles of lineations, together with means to select the production of the signals according to either of such patterns.

32. Means as defined in claim 31, together with means to receive and translate said signals for production of an intelligible raster, said receiving and translating means including means to receive and translate the signals received according to both of said patterns of signal emission by the sending station.

33. Means as defined in claim 32, wherein the signal translating means includes an electron beam excitable screen having elemental areas constituted to produce illumination under such excitation, said elemental areas comprising lineations constituted to produce illumination under excitation of such electron beam, and wherein the lineations are constituted to produce such illumination in the same color for excitation at all points along such lineation, the successive lineations producing different primary colors of a series of primary colors in a regular order of color progression repetitively when crossing the lineations in a path of travel non-parallel to the lineations, means to produce successive horizontal deflections of the electron beam at successively vertically displaced locations of the screen, the successively vertically displaced locations of the screen corresponding to successive lineation locations on the screen, and means to support the screen for rotation between an angular position of horizontality of the lineations, and an angular position of non-horizontality of the lineations in which the horizontal deflections of the electron beam intersect the lineations successively according to an order of progress of the primary colors of the illuminations produced by excitation of the lineations.

34. Means as defined in claim 33, together with means to rotate the screen into either of the angular positions selectively.

35. In the art of transmission of intelligence from a sending station for reception and intelligible translation by a receiving station as a raster, wherein the sending station includes means to produce and emit signals corresponding to the color intensities of the elemental areas in successive cycles of elemental areas of an object in a repetitive pattern of signals corresponding to said elemental areas, means to produce such pattern comprising cycles wherein each cycle includes signals corresponding to a plurality of the lineations, and wherein the signals for each lineation correspond to a selected primary color, and wherein each cycle includes lineations for the primary colors in a selected sequence of said colors, together with means to include in the emitted signals a special control signal, together with means to receive and translate the signals which correspond to the color intensities of the lineation elemental areas, wherein said signal translating means includes an electron beam excitable screen having lineations constituted to produce illumination under such electron beam excitation, wherein each lineation is constituted to produce illumination of one color when excited at each area of its length, and wherein the successive lineations are constituted to produce illuminations of the primary colors and white in a regular order of succession of said colors and white alternately for the successive lineations, means to cause the electron beam to execute successive horizontal deflections across the screen, means to deflect the beam vertically corresponding to successive horizontal deflections to produce register of the beam with alternate lineations during successive horizontal deflections, and means to cause the beam to register with either the color illumination producing lineations or the white illumination producing lineations selectively, said selecting means including means responsive to the special control signal aforesaid.

36. Means as defined in claim 35, together with means to control the inclusion of the special control signal in the signals emitted by the sending station, said signal control means having a first signal non-injecting position and a second signal injecting position, the selecting means of the receiving station having a first control position corresponding to absence of the special control signal from the signals received by the receiving station and having a second control position corresponding to response to the special control signal emitted by the sending station, one of the control positions of the selecting means of the receiving station corresponding to registration of the electron beam with the color producing lineations and the other control position of said selecting means corresponding to registration of the electron beam with the white illumination producing lineations of the receiving and translating means.

37. Means as defined in claim 36, wherein the control position of the selecting means of the receiving station which corresponds to registration of the electron beam with the color producing lineations is the first control position above defined.

38. Means as defined in claim 37, wherein when the selecting means of the receiving station is in the second control position the registration of the electron beam is produced with the white illumination producing lineations.

39. Means as defined in claim 38, together with operator controlled means to restore the selecting means of the receiving station to its first control position.

40. Means as defined in claim 39, wherein the means to restore the selecting means of the receiving station to its first control position comprises a pre-pay device.

41. Means as defined in claim 39, wherein the means to restore the selecting means of the receiving station to its first control position comprises a remote control device.

42. A system for the transmission of intelligence from a sending station to a receiving station wherein the sending station includes means to produce and emit a pattern of signals corresponding to successive elements of the intelligence to be transmitted, and wherein the receiving station includes means to receive and translate said signals, said translating means including means to selectively produce and present to the user of the receiving station either of two intelligible interpretation patterns of such received signals, being a first grade interpretation pattern and a second grade interpretation pattern, both of which interpretation patterns are intelligible replicas of the intelligence represented by the signals transmitted from the sending station, said interpreting and presenting means including means to select either interpretation, together with means to make a record of the use of the receiving station for translation and presentation of a selected one of said grades of interpretation, said record making means including a tape, means to support the tape, means to advance the tape lengthwise at substantially uniform speed, a recording stylus corresponding to said selected grade of interpretation, said stylus being engageable with the surface of the tape, connections between the means to receive and translate the received signals, and said record making means, said connections including means to activate the stylus during replica reception of the grade pattern corresponding to such stylus, said activating means including operative means constituted to cause said stylus to produce a record on the tape during such activation of such stylus, said activating means including activation starting and stopping means constituted to cause said stylus to produce its record only during intervals of interpretation of said selected grade.

43. A system for the transmission of intelligence from a sending station to a receiving station wherein the sending station includes means to produce and emit a pattern of signals corresponding to successive elements of the intelligence to be transmitted, and wherein the receiving station includes means to receive and translate said signals, said translating means including means to selectively produce and present to the user of the receiving station either of two intelligible interpretation patterns of such received signals, being a first grade interpretation pattern and a second grade interpretation pattern, both of which interpretation patterns are intelligible replicas of the intelligence represented by the signals transmitted from the sending station, said interpreting and presenting means including means to select either interpretation, together with means to make a record of the use of the receiving station for translation and presentation of a selected one of said grades of interpretation, said record making means including means to make a record of time durations of said selected grade interpretation, the means to select the grade of interpretation including a movable grade selector control element having a first defined position corresponding to said selected grade interpretation and a second defined position corresponding to said selected grade non-interpretation, operative connections between said grade selection control element and the means to select either grade of interpretation, and constituted to cause the interpretation grade selecting means to select said grade of interpretation when the grade selector control element is in said first defined position, and to cause the interpretation grade selecting means to non-select said grade of interpretation when the grade selector control element is in said second defined position, together with operative connections between the grade selector control element and the means to record time durations of said selected grade interpretation, said operative connections being constituted and including means to record lapse of time while said grade selector control element is in said first defined position, and to non-record lapse of time while said selector control element is in said second defined position.

44. Means as defined in claim 43, wherein said operative connections between the grade selector control element and the means to record time durations of said selected grade interpretation include means to record times of starting said selected grade interpretation.

45. Means as defined in claim 43, wherein said operative connections between the grade selector control element and the means to record time durations of said selected grade interpretation include means to record times of stopping said selected grade interpretation.

46. Means as defined in claim 43, wherein said operative connections between the grade selector control element and the means to record time durations of said selected grade interpretation include means to record times of starting and stopping said selected grade interpretation.

47. Means to receive and interpret a selected program of a plurality of programs each emitted as a series of progressive signals from a sending station in the form of successive receiver-tunable signals, said receiving means including first movable means to select and receive and tune the signals corresponding to a selected one of such programs, and also including means and connections to produce a first defined intelligible embodiment of the interpretation of said signals corresponding to such selected program, second movable means movable between a first defined position and a second defined position, the connections for the first defined intelligible embodiment of the interpretation including the second movable means in its first defined position, said receiving means including second means and connections to produce a second defined intelligible embodiment of the interpretation of the signals so selected and received and tuned by said selecting and receiving and tuning means and including the second movable means in its second defined position; time of use recording means corresponding to each of the interpretations of the program to be received and interpreted by said receiving means, connections between the signal selecting and receiving and tuning means, and the recording means for the first defined embodiment of the interpretation of such program, constituted to make a record of time of tuning use of the receiving means for the first defined intelligible interpretation of such program, and connections between the signal selecting and receiving and tuning means, and the recording means for the second defined embodiment of the interpretation of such program, constituted to make a record of time of tuning use of the receiving means for the second defined intelligible interpretation of such program, said last named connections including the second defined position of the second defined movable means.

48. Means as defined in claim 47, wherein the connections which are between the signal selecting and receiving and tuning means, and the recording means for the first defined embodiment of the interpretation of each such program are also constituted to produce a record of time of tuning use of the receiving means for the second defined intelligible interpretation of each such program.

49. Means as defined in claim 47, together with means to move the second movable means to said second defined position of said means against a force urging said means to said first defined position of said means.

50. Means as defined in claim 49, wherein said second movable means is in said first defined position of said second movable means under urge of said urging force when the means to move said second movable means against said urging means exerts no force.

51. Means as defined in claim 49, wherein the means to move the second movable means to said second defined position of said second defined means, comprises a coin controlled unit.

52. Means as defined in claim 49, wherein the means to move the second movable means to said second defined position of said second defined means, comprises a remote control device.

53. Means as defined in claim 47, wherein the signals emitted from the sending station comprise groups of signals corresponding to parallel lineations, and wherein the signals of the successive groups correspond to successively scanned parallel lineations of a raster to be produced, and wherein the successive groups of signals correspond to a spatial progress from parallel lineation to parallel lineation in a given direction at right angles to the lineations; and wherein the receiving means includes means to receive and translate received signals according to a repetitive pattern of lineations to be produced on the raster synchronously with emission of corresponding groups of lineation signals by the sending station; and wherein the connections to produce the first defined intelligible embodiment of the interpretation of the signals which include the second movable means in its first defined position are constituted to translate the received signals in a first sequence direction of spatial progress from parallel lineation to parallel lineation on the raster produced by the receiving means; and wherein the connections to produce the second defined intelligible embodiment of the interpretation of the signals which include the second movable means in its second defined position are constituted to translate the received signals in a second sequence direction of spatial progress from parallel lineation to parallel lineation on the raster, being the direction opposite to said first sequence direction.

54. Means as defined in claim 53, wherein the second sequence of the translated lineations produced by the connections which produce the second defined intelligible embodiment of the interpretation of the signals emitted from the sending station and received and interpreted by the receiving station, including the second movable means in its second defined position, is the same as the sequence direction of the lineation signals emitted by the sending station.

55. Means as defined in claim 54, wherein the successive groups of signals emitted by the sending station correspond to successively scanned lineations to be produced in monochrome by the receiving means.

56. Means as defined in claim 47, wherein the signals emitted from the sending station comprise signals corresponding to a selected group of primary colors and corresponding to the intensities of such primary colors; and wherein the progressive emission of said signals includes emission of said signals corresponding to a pre-selected sequence of the primary colors in a repetitive pattern of such sequence; and wherein the receiving means includes means to receive and translate received signals according to a repetitive pattern of incremental color areas synchronously with the repetitive pattern of the signals emitted by the sending station; and wherein the connections to produce the first defined intelligible embodiment of the interpretation of the signals which include the second movable means in its first defined position are constituted to translate the received signals in a first sequence of the translated primary colors; and wherein the connections to produce the second defined intelligible embodiment of the interpretation of the signals which include the second movable means in its second defined position are constituted to translate the received signals in a second sequence of the translated primary colors.

57. Means as defined in claim 56, wherein the second sequence of the translated primary colors produced by the connections which produce the second defined intelligible embodiment of the interpretation of the signals emitted from the sending station and received and interpreted by the receiving station, including the second movable means in its second defined position, is the same as the sequence of the primary colors of the signals emitted by the sending station.

58. Means as defined in claim 56, wherein the repetitive pattern to which the sequence of emission of the signals emitted by the sending station corresponds is a pattern including an array of small incremental areas which areas correspond to the primary colors, and in all of which arrays the primary colors are included in the same spatial sequential relationship to each other; and wherein the repetitive pattern of incremental color areas for signals received and translated by the receiving means comprises arrays of small incremental color areas, and wherein each such array includes areas of the primary colors in a sequence of such colors, and wherein the color sequences of all such arrays are the same; and wherein the first sequence of the translated primary colors produced by the connections which include the second movable means in its first defined position is the reverse of the second sequence of the translated primary colors produced by the connections which include the second movable means in its second defined position.

59. Means as defined in claim 58, wherein the second sequence of the translated primary colors produced by the connections which produce the second defined intelligible embodiment of the interpretation of the signals emitted from the sending station and received and interpreted by the receiving station, including the second movable means in its second defined position, is the same as the sequence of the primary colors of the signals emitted by the sending station.

References Cited in the file of this patent

UNITED STATES PATENTS

| | | |
|---|---|---|
| 2,630,365 | Rahmel | Mar. 3, 1953 |
| 2,755,334 | Banning | July 17, 1956 |
| 2,769,023 | Loew | Oct. 30, 1956 |
| 2,788,387 | Druz | Apr. 9, 1957 |